US006232934B1

(12) United States Patent
Heacock et al.

(10) Patent No.: US 6,232,934 B1
(45) Date of Patent: May 15, 2001

(54) BINOCULAR HEAD MOUNTED DISPLAY SYSTEM

(75) Inventors: Gregory Lee Heacock, Camas; Gordon B. Kuenster, Medina; Kevin W. Shimasaki, Bothell, all of WA (US)

(73) Assignee: Virtual Vision, Redmond, WA (US)

( * ) Notice: Subject to any disclaimer, the term of this patent is extended or adjusted under 35 U.S.C. 154(b) by 0 days.

(21) Appl. No.: 08/419,064

(22) Filed: Apr. 10, 1995

Related U.S. Application Data

(63) Continuation of application No. 08/133,518, filed on Oct. 7, 1993, now abandoned.

(51) Int. Cl.[7] .................................................. G09G 5/00
(52) U.S. Cl. ................................................ 345/8; 345/7
(58) Field of Search .................... 345/7, 8, 9; 358/88, 358/92; 359/13, 630, 631, 632, 633, 466, 472

(56) References Cited

U.S. PATENT DOCUMENTS

| 1,440,457 | * | 1/1923 | Girsdansky | 359/472 |
| 2,463,311 | * | 3/1949 | Ramsdell | 359/466 |
| 2,955,156 | * | 10/1960 | Heilig | 358/88 |
| 3,670,097 | * | 6/1972 | Jones | 359/472 |
| 4,190,856 | * | 2/1980 | Ricks | 358/88 |
| 4,559,555 | * | 12/1985 | Schoolman | 358/88 |
| 4,869,575 | * | 9/1989 | Kubik | 345/8 |
| 4,982,278 | * | 1/1991 | Dahl | 358/92 |
| 5,093,567 | * | 3/1992 | Staveley | 345/8 |
| 5,153,569 | * | 10/1992 | Kawamura | 345/8 |
| 5,189,512 | * | 2/1993 | Cameron | 345/8 |
| 5,281,957 | * | 1/1994 | Schoolman | 345/8 |

OTHER PUBLICATIONS

Upton, S. "7.2/2:35 PM: Eyeglasses Heads–Up Display" SID '81 Digest p 48–49.*

* cited by examiner

Primary Examiner—Matthew Luu
(74) Attorney, Agent, or Firm—McAndrews, Held & Malloy, Ltd.

(57) ABSTRACT

A binocular head mounted display unit utilizing a single display and binocular optical system is shown for projecting an enlarged image of displayed information in the direct line of sight and central field of view of each of the user's eyes, while maintaining the user's peripheral vision free from obstruction to allow the user to selectively focus on the virtual image or not. The binocular optical system directs the user's eyes inward at an angle that is natural for a person viewing an object at a distance that is less than infinity. Further, the binocular optical system automatically compensates for variations in the interpupillary distances of various users, wherein those variations may be as great as one inch. This head mounted display unit is suitable for a variety of applications, including virtual reality applications, as well as a display for a compact portable computer.

45 Claims, 15 Drawing Sheets

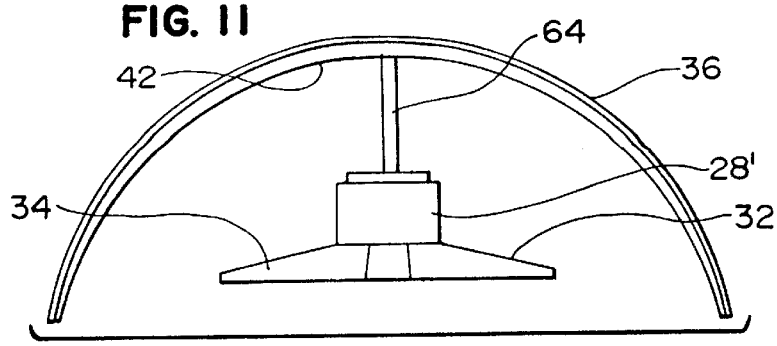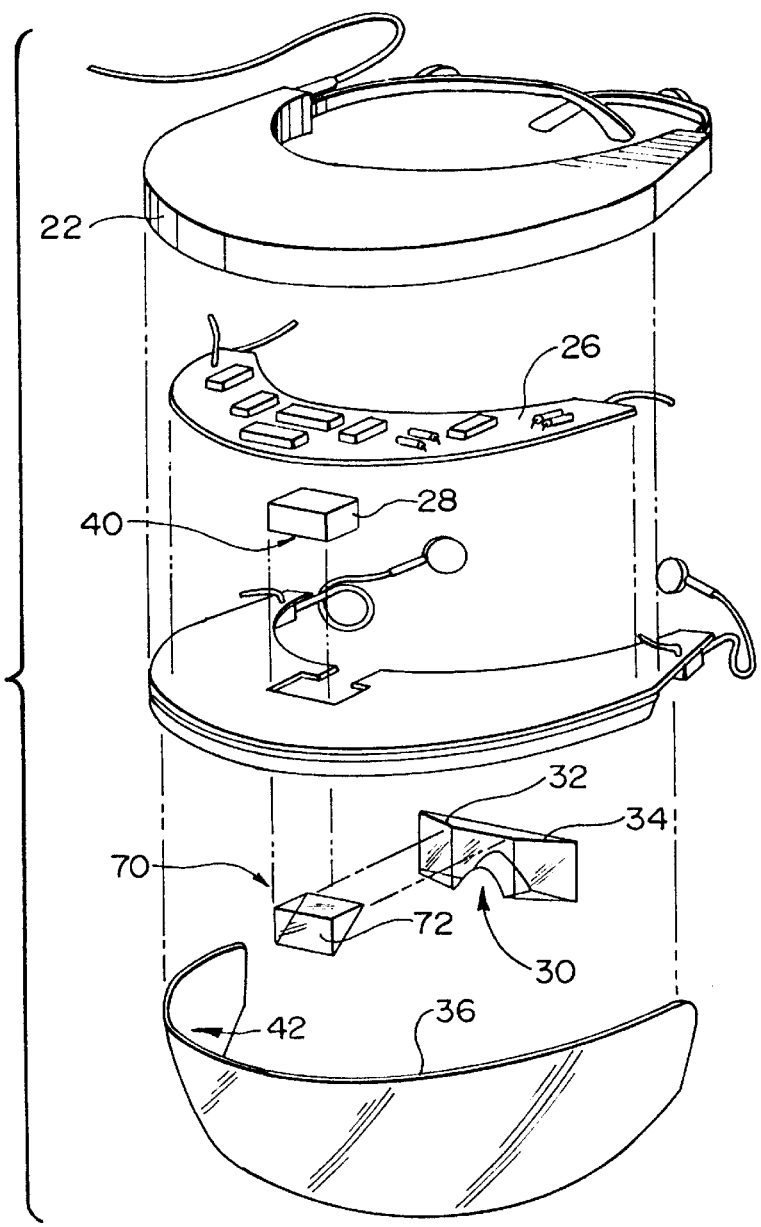

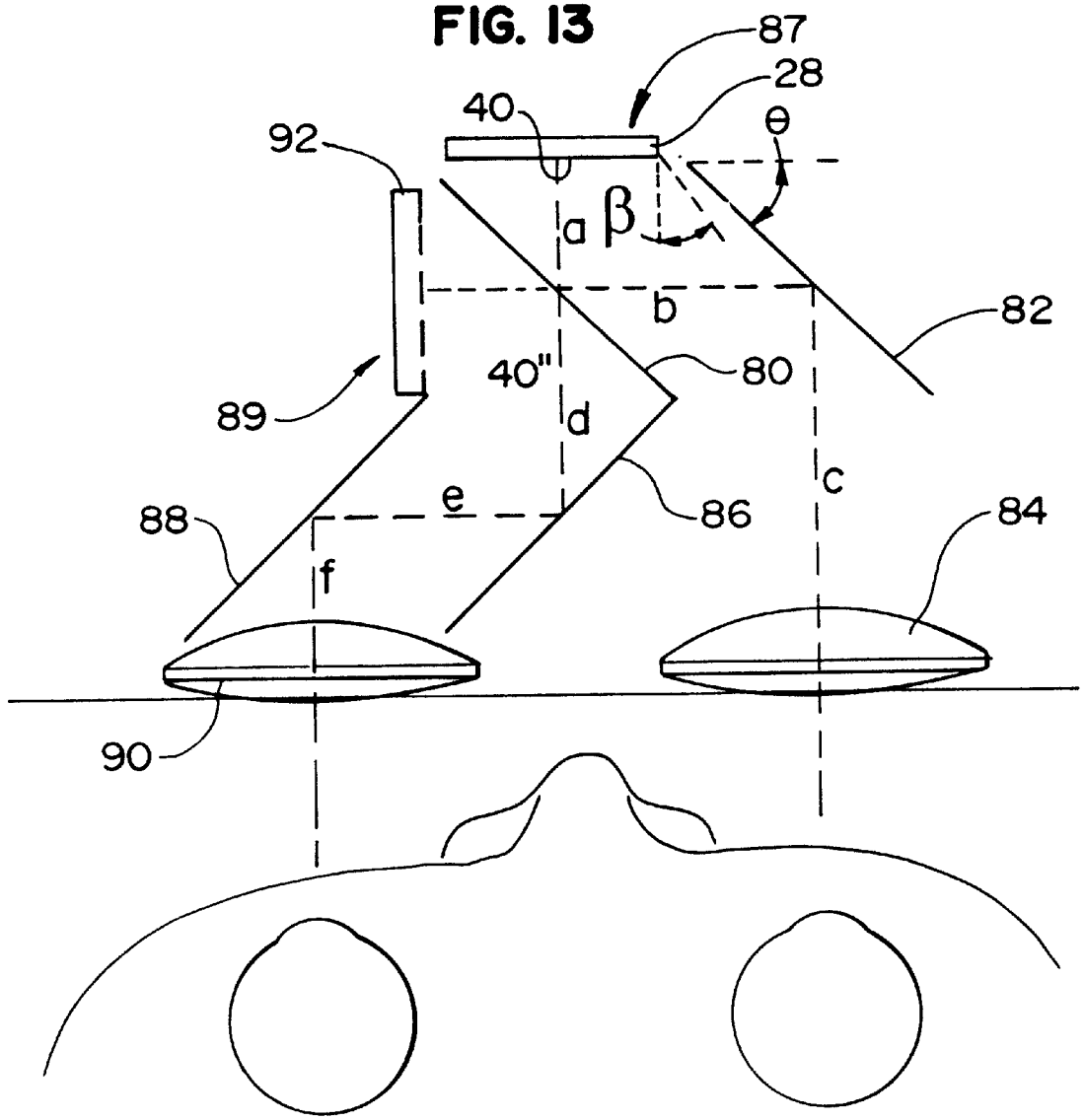

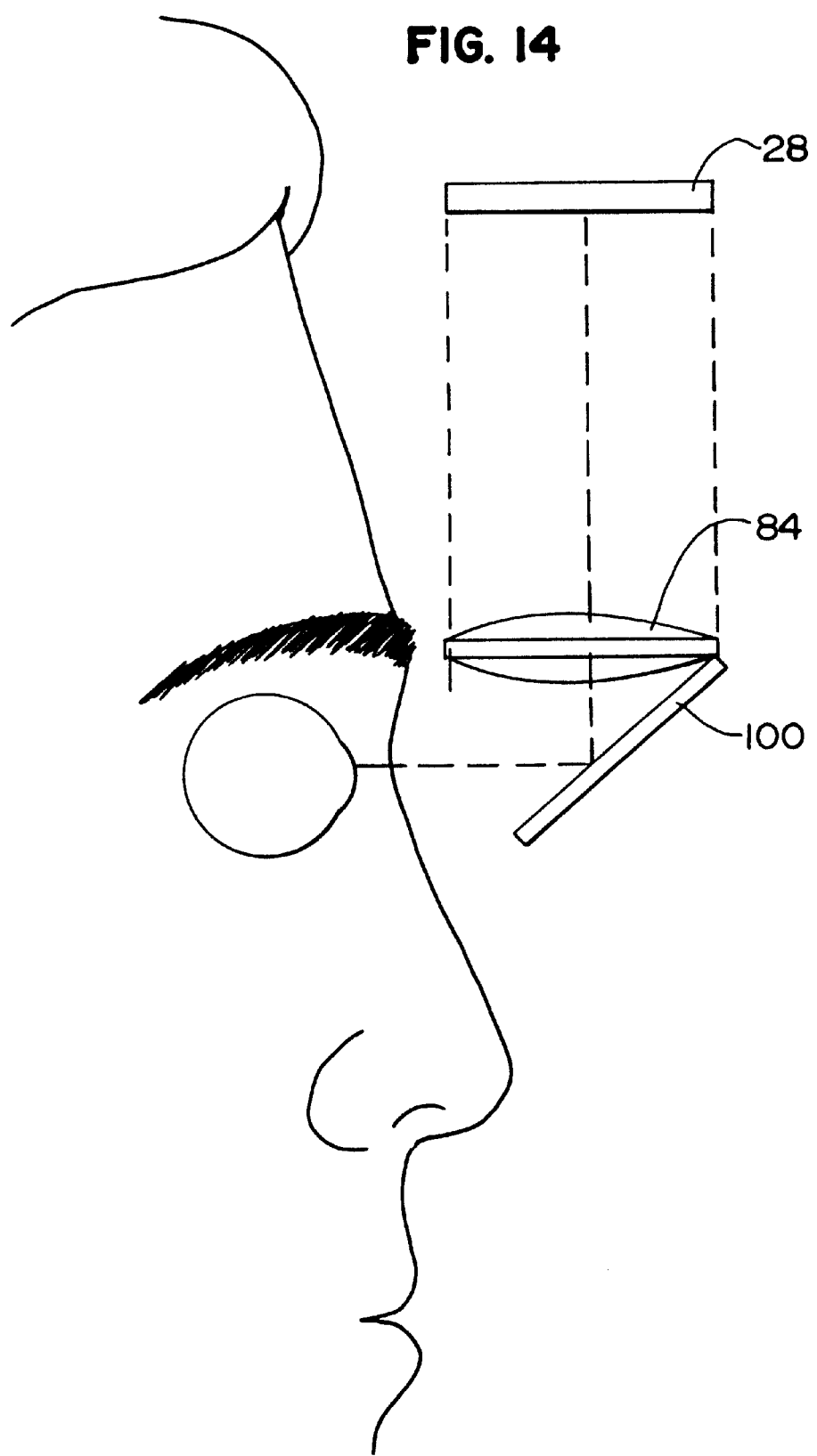

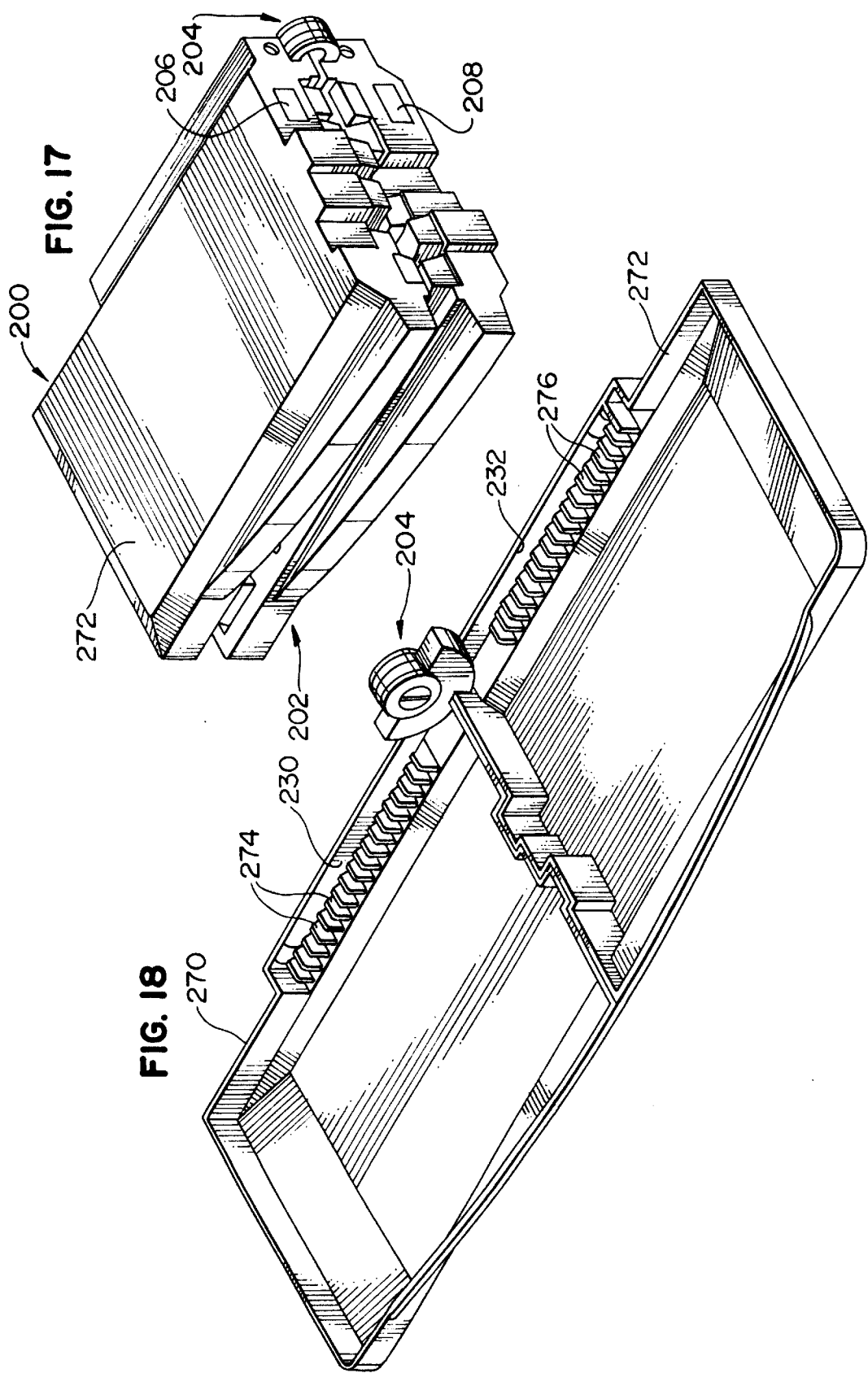

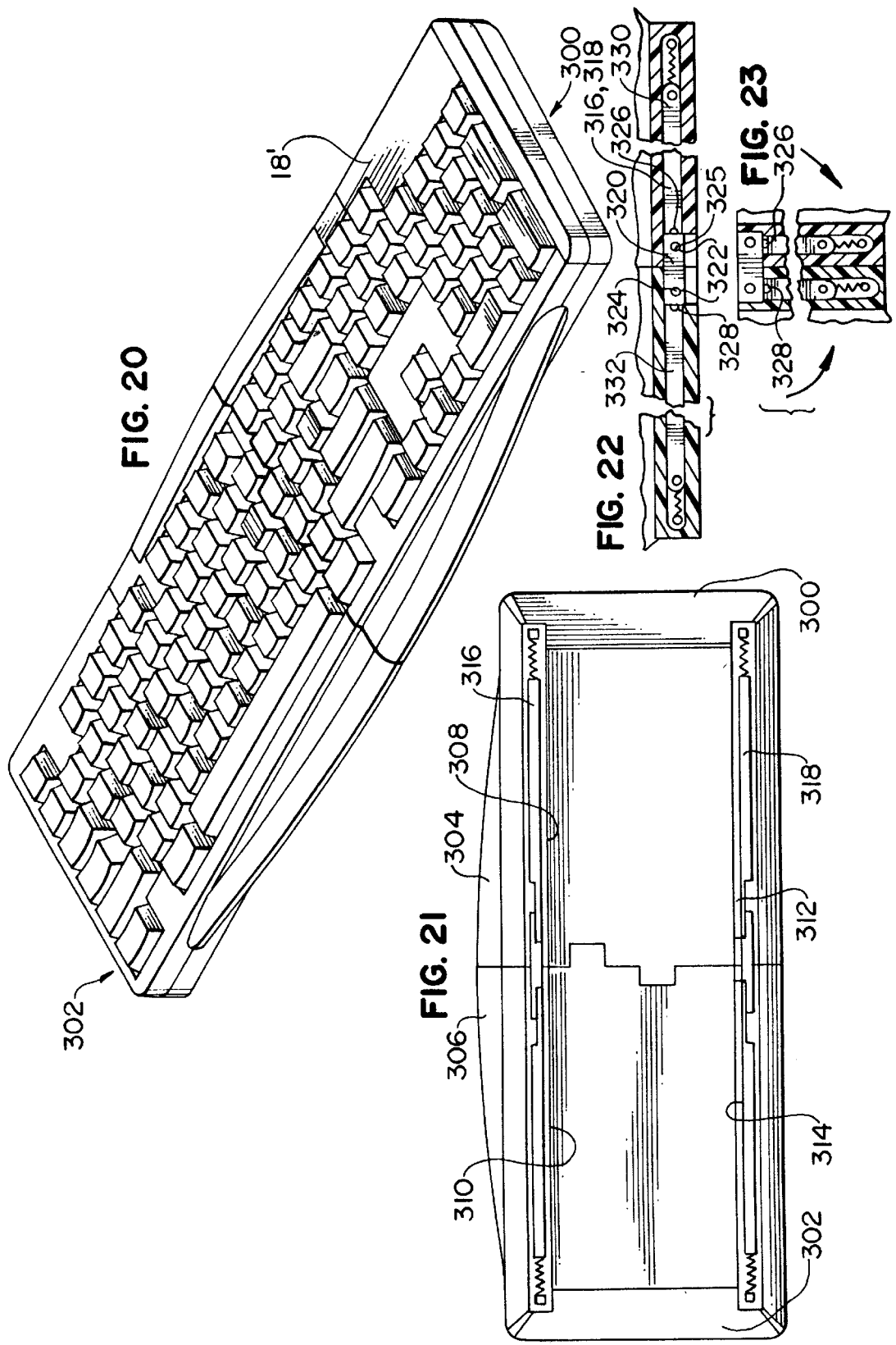

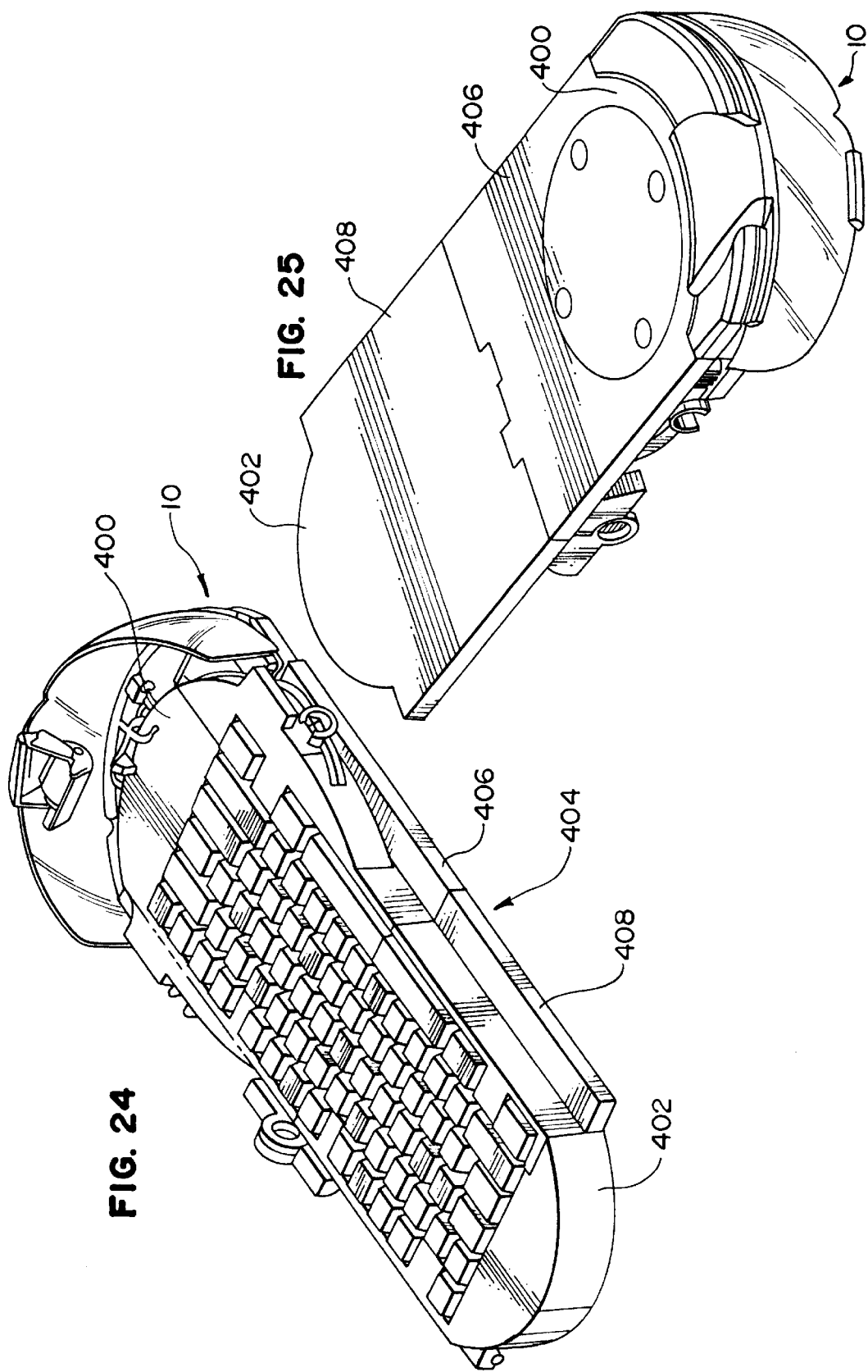

BINOCULAR HEAD MOUNTED DISPLAY SYSTEM

This is a continuation of application Ser. No. 08/133,518 filed Oct. 7, 1993 now abandoned.

TECHNICAL FIELD

The present invention is directed to a head mounted display system and more particularly to a single display, binocular system that projects an image in the direct line of sight of the user's eyes while maintaining the user's peripheral vision relatively free from obstruction to allow the user to selectively focus on the virtual image or not.

BACKGROUND OF THE INVENTION

Binocular head mounted display systems allow a user to view an image or images of displayed information with both eyes. Typical binocular head mounted display systems include two displays, one for each of the user's eyes, as well as two sets of identical optics so as to be very costly and heavy. Binocular head mounted display systems that include only a single display are also known. Both types of systems typically direct the user's eyes such that the axes of the eyes are parallel for viewing a projected image focused at infinity. For virtual reality applications in which the user is to be totally immersed in the video image, these binocular systems are further formed so that the user's field of view is completely blocked, the user being unable to see anything but the displayed image.

These known systems have a number of problems. For example, it has been found that with head mounted display systems in which the user cannot focus on anything but the projected image, eye fatigue often occurs. Such systems can cause feelings of claustrophobia because the user's view is completely enclosed and feelings of anxiety because the user can hear things going on in his surroundings but is not able to see what is happening. With these systems the user can also experience "sea sickness" when the motion of the image that he is viewing does not coincide with the motion that the user's body is experiencing.

Binocular systems in which the user's eyes are directed such that the axes of the eyes are parallel have been found to contribute to eye fatigue when the image is focused at less than infinity. Eye fatigue and feelings of discomfort result because it is unnatural for a person's eyes to be such that the axes of the eyes are parallel when viewing an image that is only two or three feet away.

Known binocular systems are typically designed for users having a particular "average" or "normal" interpupillary distance (hereinafter referred to as IPD). Because the IPD of users can vary considerably, these systems are usable only by a very limited portion of the population and are not suitable for general consumer applications. If a user has an IPD that varies considerably from the average IPD for which the system is designed his eye will be off of the axis of the optical system. User's who are off-axis typically see right eye and left eye images that do not line up. They may also see distortions in the image wherein one side of the image will look bigger than the other side, and/or a part of the image will be in focus while other parts of the image will be out of focus. Further, a portion of the image depicted on the display may be cut off when viewed off axis through the optics of the system.

SUMMARY OF THE INVENTION

In accordance with the present invention, the disadvantages of prior binocular head mounted display systems have been overcome. The head mounted display system of the present invention is a single display binocular system that is usable by a large portion of the population without modification. The head mounted display system of the present invention is suitable for applications requiring the user to comfortably focus at less than infinity, as well as applications requiring the user to focus at infinity, and is further suitable for applications requiring the user to view his surroundings while viewing the projected image, as well as for virtual reality applications.

More particularly, the head mounted display system of the present invention includes a support to mount the display system on a user's head; a single video image source, such as a display, that is mounted on the support; and a compact binocular optical system of minimal weight for projecting an enlarged virtual image of the video from the image source at a distance from the user that is greater than the actual path length of the optical system. Because the optical system is compact and lightweight, the support may be similar to the frame of a pair of glasses or other conventional eyewear and does not require the support to take the form of a helmet or other substantial arrangement in order to act as a counter weight for the optics as in known systems.

One feature of the binocular optical system of the present invention is that it projects a virtual image in the central field of view of each of the user's eyes, wherein the optical system and support are such as to maintain at least a portion of the peripheral view of each of the user's eyes free from obstruction. Because at least a portion of the peripheral view of each of the user's eyes is free from obstruction, the user can selectively focus on the projected image or not to minimize or substantially eliminate eye fatigue. Further, because the user is visually cognizant of his surroundings while he is viewing the virtual image, feelings of anxiety and claustrophobia are eliminated. It is also noted, that because the user can selectively view his surroundings, the system of the present invention does not promote feelings of "sea sickness" as frequently encountered with other systems.

Although the user can simultaneously view his surroundings as well as the virtual image with the head mounted display system of the present invention, it has been found that the present system creates a feeling of total immersion in the video image. Therefore the system is suitable for virtual reality applications without having the problems associated with binocular head mounted display systems typically used for such applications. This feeling of total immersion in the video image with the system of the present invention is quite surprising since heretofore it was thought that for total immersion, the user should not see anything but the projected video image. It has further been found that because the user has at least some vision of the real world, as well as the virtual image, the three-dimensional cues in the real world cause the user to perceive that the virtual image has depth, i.e. is three dimensional without requiring a stereo image source.

Another feature of the binocular optical system of the present invention is that it includes a right eye optical centerline path and a left eye optical centerline path with at least one optical element in each of these paths, wherein the right eye and left eye optical centerline paths are angled in towards the virtual image perceived by the user. Because the optical, centerline paths of the system are angle in towards the virtual image, the user's eyes are directed inward at an angle that is natural for a person viewing an object at a distance that is less than infinity as opposed to being directed so that the axes of the eyes are parallel. With the user's eyes directed naturally inward to the location of the virtual image, the head mounted display system of the present invention is more comfortable and less eye straining than prior systems.

A further feature of the binocular optical system of the present invention is that it automatically compensates for variations in the interpupillary distance of different users, wherein those variations may be as great as one inch. Therefore, the head mounted display system of the present invention is suitable for use by a vast majority of the population without requiring manual adjustment to any of the optical elements. In one embodiment, variations in interpupillary distance are automatically compensated for utilizing in each of the right eye and left eye paths a prism that bends the light from any location along the width thereof, representing various positions of users' eyes with different IPDs, towards a central area on a concave reflector. This concave reflector focuses the light path from the user's right and left eyes to the same point on the display, which is preferably the center of the display. In another embodiment, a focusing lens is disposed in each of the right eye and left eye optical paths, such that light at any location along the width, i.e. diameter, of the lens representing various positions of users' eyes, is focused on the same point, mirrors being disposed in each of the right eye and left eye optical paths to direct the path of the light from the user's eyes through the respective lenses to the same point on the display.

In accordance with a further feature of the present invention, the binocular optical system may include a semi-transparent reflector into which the user looks to view the virtual image in a portion of his field of view. The display may further include a brightness control allowing the brightness of the display to be varied to cause the virtual image to block that portion of the user's field of view in which the image is projected; to cause the virtual image to be superimposed on the real world in that portion of the user's field of view in which the image is projected so that both the image and the real world in that portion can be simultaneously seen by the user; or to cause the virtual image to be extinguished from that portion of the user's field of view so that the user sees the real world, but does not see the virtual image at all. This feature can also be accomplished by providing a display which can be controlled so that light does not pass from the display in a defined area or window thereof. When this light blocking feature of the display is actuated, a window into the real world is provided through the displayed image and when not actuated, the image is seen in its entirety.

The head mounted display system of the present invention is suitable for any application requiring the viewing of displayed information. Because of a number of the features noted above, the system of the present invention is eminently suitable for a computer display. Therefore, in accordance with the present invention, the head mounted display system forms the display of a computer, the electronics of which are housed in a keyboard housing. The keyboard is designed to be compact, and in one embodiment is foldable. The keyboard may also include a mounting surface for the head mounted display unit so that the computer can be easily carried. Because the head mounted display is compact and lightweight, the overall weight and size of the computer in accordance with the present invention is greatly reduced over prior portable computer systems. The image viewed by the user with the computer display of the present invention can be as large or larger than the image depicted on conventional non-portable computer displays, unlike the displays of typical portable computers. Further, because the head mounted display is a personal display unit, only the user can see what is being displayed on his computer so as to allow the user to work on confidential information while in a public setting, such as on an airplane.

These and other objects, advantages, and novel features of the present invention, as well as details of an illustrated embodiment thereof, will be more fully understood from the following description and the drawing.

BRIEF DESCRIPTION OF THE DRAWING

FIG. 11 is a top view of the optics and display for a head mounted display system in accordance with still another embodiment of the present invention;

FIG. 12 is an exploded, perspective view of a folded embodiment of the head mounted display system shown in FIG. 2;

FIG. 13 is a top view of the optics for a further embodiment of the head mounted display system of the present invention depicting alternative locations for the mounting of the display used therein;

FIG. 14 is a side view of a folded embodiment of the head mounted display system depicted in FIG. 13;

FIG. 17 is a perspective view of the keyboard of FIG. 16 folded;

FIG. 18 is a top perspective view of the bottom housing and hinge assembly of the keyboard of FIG. 16;

FIG. 20 is a perspective view illustrating another embodiment of the foldable keyboard of the present invention;

FIG. 21 is a back view of the keyboard of FIG. 20 illustrating an alternative hinge arrangement;

FIG. 22 is a partial side view of the hinge arrangement of FIG. 21 wherein the hinge is in a non-folded position;

FIG. 23 is a partial side view of the hinge illustrated in FIG. 22 in the folded position;

FIG. 24 is a perspective view of an alternative embodiment of the foldable keyboard of the present invention including a mounting surface for the head mounted display unit;

FIG. 25 is a bottom view of the portable computer system depicted in FIG. 24.

DESCRIPTION OF THE PREFERRED EMBODIMENT

Figure 1:
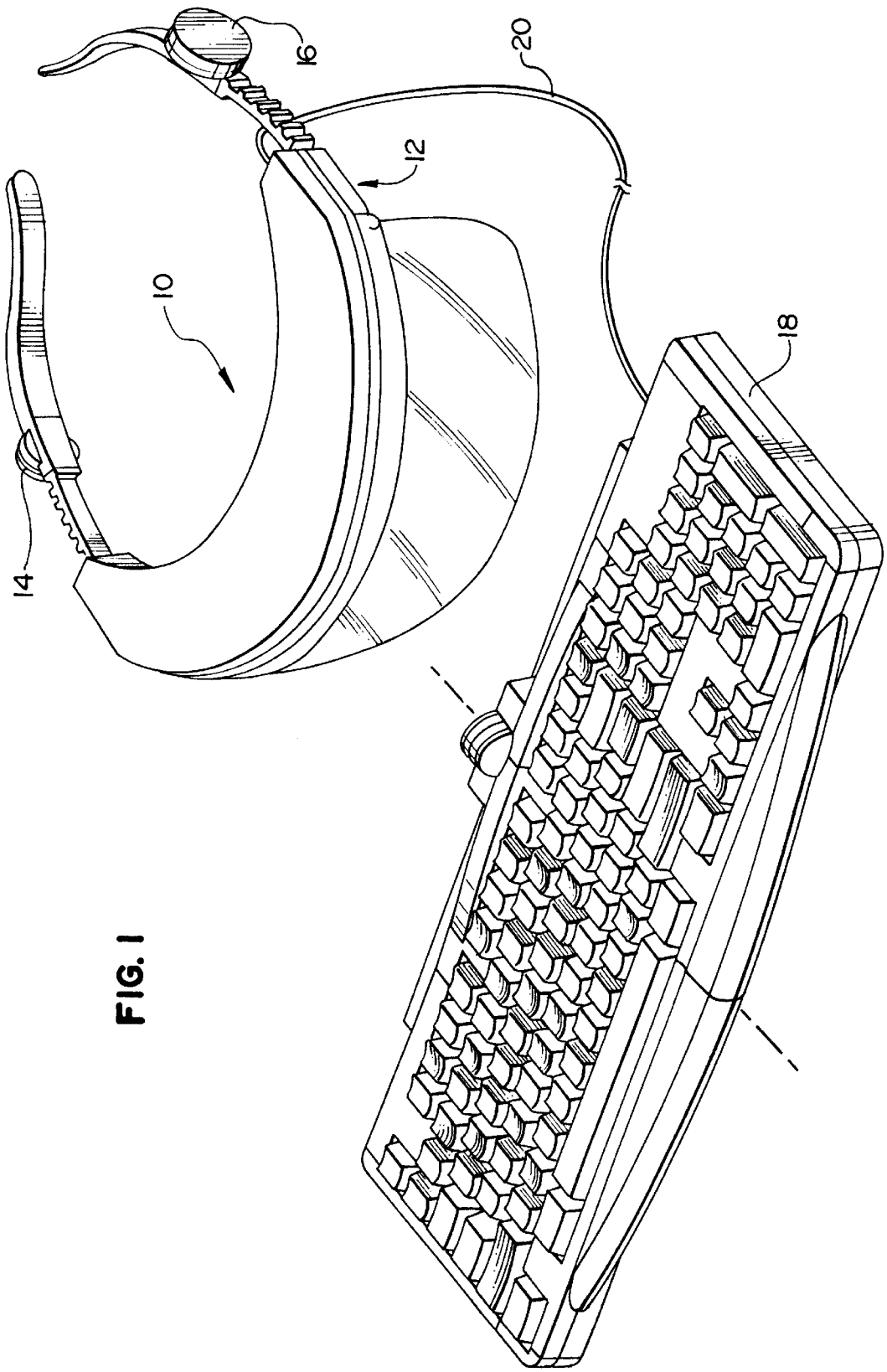
FIG. 1 is a perspective view of a head mounted display system and keyboard in accordance with the present invention forming a portable computer.

The head mounted display unit 10 of the present invention as shown in FIG. 1 includes a frame 12 that is worn on a user's head and that supports a display 28 and associated binocular optics, as discussed in detail below for the various embodiments thereof. The frame 12 may also support the drive electronics for the display and a pair of earphones 14, 16 that provide audio for the unit 10. As is well known, the drive electronics for the display are responsive to standard video input signals to drive the display to depict video information. To reduce the weight of the head mounted display unit 10 and to allow the head mounted display unit 10 to provide a universal video display that may receive video inputs from any one of a number of sources, the video input signal generator is preferably a separate, remote unit.

The video input signal generator may take the form of a television tuner, video camera, video player, video game, computer, or other device that generates a video input signal. For example, as shown in FIG. 1, the head mounted display unit 10 forms the display of a computer, the electronics for which are housed within a keyboard housing 18. Although the head mounted display system may be coupled to the video input signal generator and/or audio generator by a cable 20, as shown, the unit 10 need not be physically connected to the video/audio input signal generator. For example, the video and audio input signals may be RF modulated and transmitted from the remote unit to a head mounted display unit 10 that includes an RF receiver as described in detail in U.S. patent application Ser. No. 07/986,422, filed Dec. 4, 1992, assigned to the Assignee of the present invention and incorporated herein by reference.

A binocular head mounted display system in accordance with one embodiment of the present invention is depicted in FIGS. 2–6. In this embodiment, the frame 12 of the head mounted display unit 10 includes a top cover 22 and a bottom cover 24 forming a housing for a circuit board 26 on which may be mounted the drive electronics for the display 28 and the speakers 14 and 16 and/or an RF receiver. The bottom cover 24 forms a support for mounting the display 28 and the optics for the unit 10 which include a semi-reflective visor 36 and a prism 30.

More particularly, the display 28 may be a liquid crystal display or the like for depicting video information on a surface 40 that faces the inner surface 42 of the reflective visor 36. The display 28 preferably has VGA resolution so as to be suitable for displaying standard computer generated alphanumeric information and video graphic images. It is noted that liquid crystal displays are typically configured with a back light such that the light shines through the display from the back thereof. When the liquid crystal display is viewed from the front, an image appears in the proper orientation when driven by conventional signals that are used to drive a CRT, for example. This type of conventional liquid crystal display is hereinafter referred to as a right-handed display. In the embodiment of the optical system depicted in FIGS. 2–6, the information depicted on the display 28 is reflected by the visor 36 so that it may be viewed by a user. Because the optical system includes an odd number of reflectors, the image which would be seen by the user, if a conventionally mounted right-handed liquid crystal display were employed, would be reversed from right to left. Although this reversal may not be noticeable for non-text video information, alphanumeric text displayed backwards would not be readable by a user. This problem can be overcome by inserting another reflector in the optical path, although the additional reflector increases the weight of the unit. Another option is to control the image source to output a reversed image. This option would, however, require non-standard and complicated electronics. In the preferred embodiment, the reversal of the image is corrected by removing the back light from the back surface of a conventional "right-handed" liquid crystal display; mounting the liquid crystal display in a reverse right-to-left orientation so that it forms a left-handed display with the conventional back of the display forming the viewable image surface 40 and mounting the back light on the conventional front surface of the display. When the liquid crystal display is oriented in this manner, it may be driven in a conventional manner such that the image, when viewed directly, will appear in a reverse orientation. However, when a user views the image as reflected from the display by the visor 36, alphanumeric text will appear in the proper right-to-left orientation.

The binocular optical system of the embodiment of FIGS. 2–6 includes prism elements 32 and 34 disposed respectively in a right-eye path 50 and a left-eye path 52 so as to bend light from any position along the width, W, of the prism 32, 34 towards a central area C of the visor 36. The visor 36 is a concave reflector that directs both the right-eye optical centerline path and the left-eye optical centerline path to the same point on the face of the display 28. When the image of the information depicted on the display 28 is to appear at optical infinity, the display should be located with respect to the reflective visor 36 such that the focal point of the visor 36 is at the center of the display.

Figure 6:
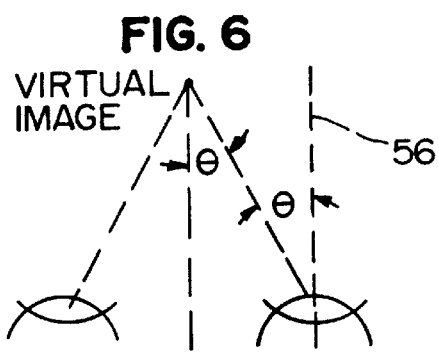
FIG. 6 is a schematic illustration of the convergence angle of the user's eyes when the image is focused at less than infinity with the system depicted in FIG. 5.

When the image of the information depicted on the display is to appear at less than infinity, such as for viewing displayed alphanumeric information, the display 28 is located at a distance from the visor 36 that is less than the focal length of the visor 36, wherein the optical centerline or chief ray 54 of the visor intersects the center of the display. In this later instance, the prisms 32 and 34 are mounted on the bottom cover 24 so that the optical centerline of each prism 32, 34 is angled in towards the location of the virtual image to thereby cause the user's eyes to angle in slightly to view the virtual image. The angle of each of the prisms 32 and 34 and the angle of the user's eye when looking in towards the virtual image is referred to as the convergence angle θ. The convergence angle θ is shown in FIG. 6 with respect to the axis 56 of the eye when looking straight ahead. The convergence angle is selected to be approximately equal to the natural inward angle of the eyes when viewing an object at the same distance from the user as the distance that the virtual image appears. The convergence angle is very small being on the order of 2°–4° for a virtual image that appears approximately two feet or 0.75 m from the user. As the virtual image is moved closer to optical infinity, the convergence angle is reduced to zero. It has been found that by angling the right-eye and left-eye optical centerline paths slightly in towards the location of the virtual image, eye fatigue is reduced. This is because the user is use to angling his eyes in towards a real object that is located at a distance that is less than optical infinity.

Figure 2:
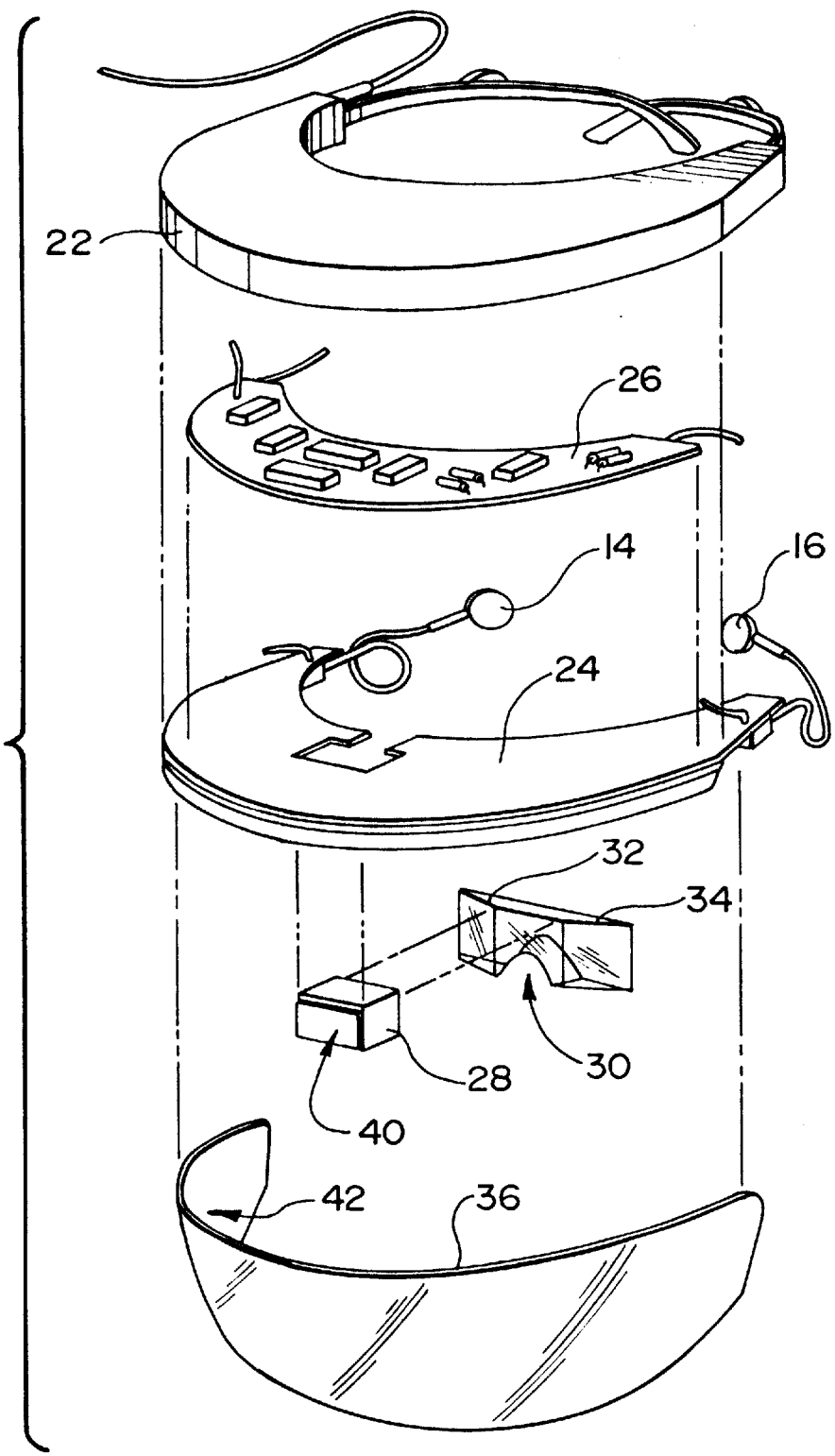
FIG. 2 is an exploded, perspective view of a head mounted display system in accordance with one embodiment of the present invention.
Figure 3:
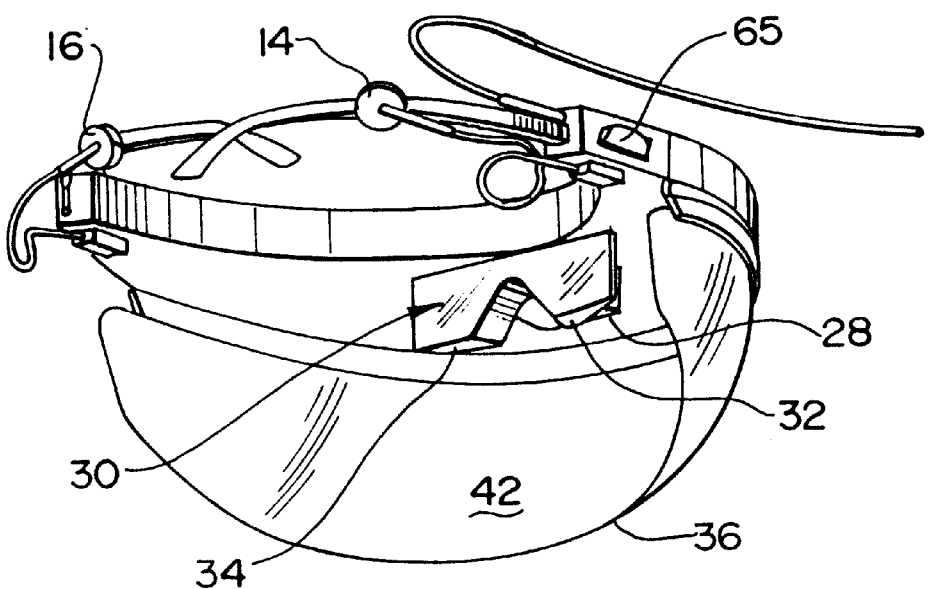
FIG. 3 is a back perspective view of the head mounted display system depicted in FIG. 2.
Figure 4:
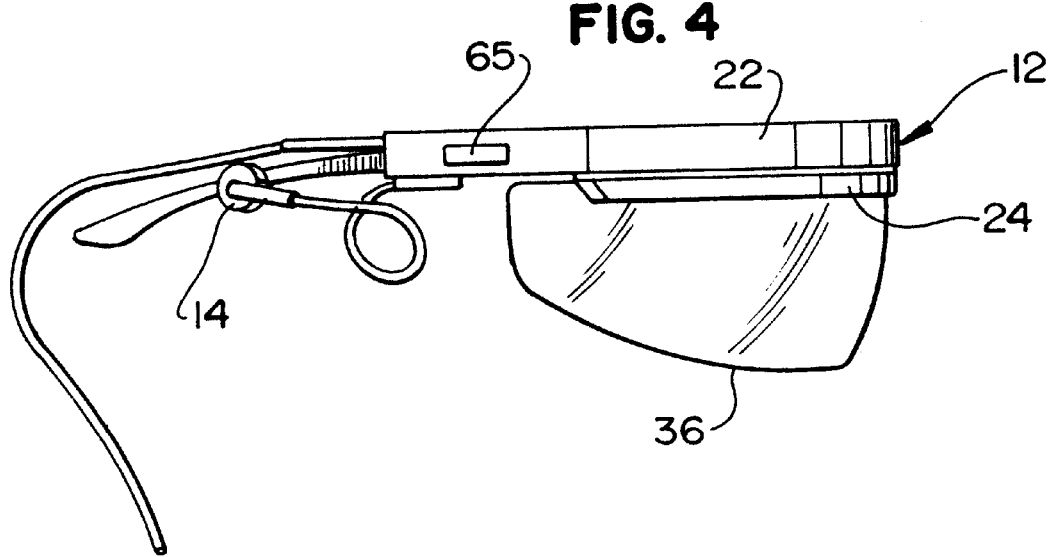
FIG. 4 is a side view of the head mounted display system depicted in FIG. 2.
Figure 5:
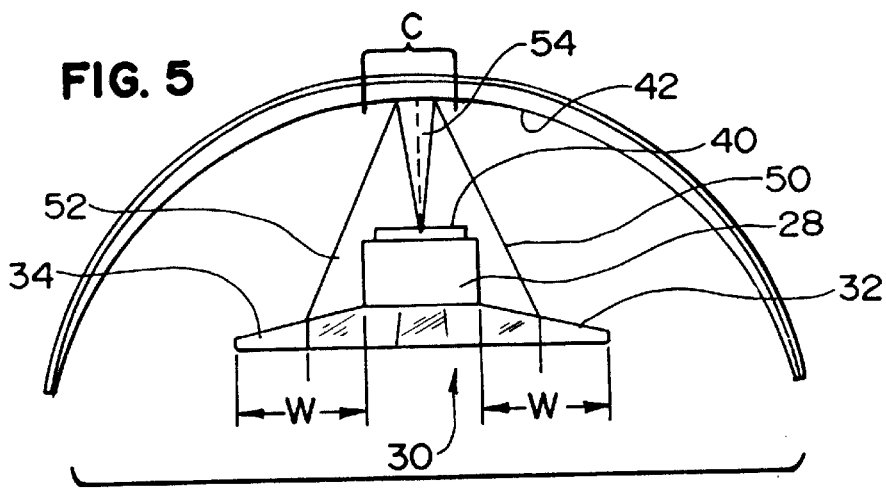
FIG. 5 is a top view of the optics and display of the system shown in FIG. 2.
Figure 7:
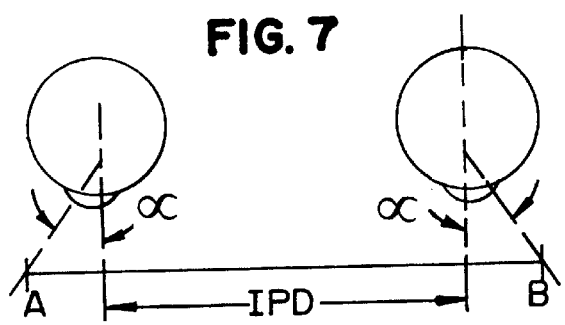
FIG. 7 is a top view of a schematic illustrating the user's side peripheral vision that is maintained unobstructed by the optical system of the present invention.
Figure 8:
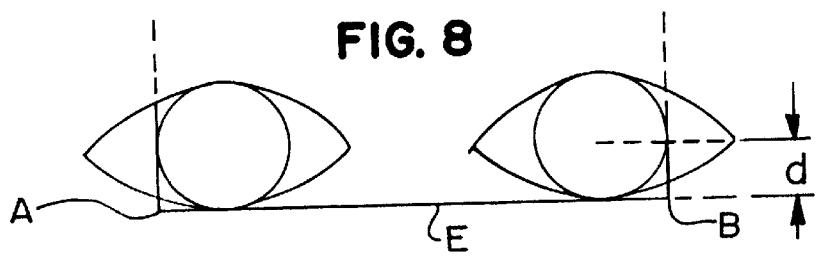
FIG. 8 is a front view of a schematic illustrating the user's side and lower peripheral vision that is maintained unobstructed by the optical system of the present invention.

In accordance with an important feature of the present invention, the optical system is such as to project a virtual image in the direct line of sight and central field of view of each of the user's eyes so that the displayed information can be the main focus of the user's attention, however the optical system and support are also such as to maintain at least a portion of the peripheral view of each of the user's eyes free from obstruction. As shown in FIGS. 7 and 8, the exit surface of the optical element(s) closest to the user's eyes, which in the case of FIG. 2 is the prism 30, is represented by the line AB where A and B respectively represent the locations of the outer side edges of the closest optical element(s). The exit surface of the closest optical element(s) is preferably approximately 20 mm from the user's eyes. The distance W from A to B is preferably on the order 100 mm so that a user having an IPD of approximately 2.5 inches or 64 mm need only move an eye to the side through an angle $\alpha$ to focus on his surroundings in his side peripheral vision. The angle $\alpha$ will vary for users having different IPDs but is generally in the range of 5°–15°. In order to maintain a substantial portion of the user's lower peripheral vision unobstructed, the lower edge E of the closest optical element preferably does not extend significantly below the bottom of the user's eye. For example, the distance d from the center of the closest optical element to the lower edge E thereof is on the order of 9 mm–15 mm.

With the system depicted in FIGS. 2–6, the user has side peripheral vision and a considerable amount of lower peripheral vision. The lower peripheral vision is important so as to allow the user to be able to view the keyboard 18 or another device such as a medical or industrial instrument without obstruction. Because at least a portion of the peripheral view of each of the user's eyes is free from obstruction, the user can selectively focus on the projected virtual image or not to minimize or substantially eliminate eye fatigue. Further, because the user is visually cognizant of his surroundings while he is viewing the virtual image, feelings of anxiety and claustrophobia are eliminated. It is also noted, that because the user can selectively view his surroundings, the system of the present invention does not promote feelings of "sea sickness" as frequently encountered with other systems.

Although the user can simultaneously view his surroundings, as well as the virtual image of the head mounted display system of the present invention, it has been found that the present system creates a feeling of total immersion in the video image. It has further been found that because the user has at least some vision of the real world, as well as the virtual image, the three-dimensional cues in the real world cause the user to perceive that the virtual image has depth, i.e., is three-dimensional, without requiring a stereo image source.

The visor 36 is preferably a semi-transparent reflector, being on the order of 80% reflective so that the user can see the real world through the visor 36. In a preferred embodiment of the invention, the display 28 includes a brightness control, such as a brightness control knob 65 mounted on the frame 12 of the head mounted display unit 10, or mounted on the keyboard housing 18. The brightness control 65 allows the brightness of the display 28 to be varied, such that the display 28, when operating near its brightest level, results in a virtual image that completely blocks that portion of the user's field of view in which the image is projected. By dimming the brightness of the display 28, the virtual image appears to be superimposed on the real world in that portion of the user's field of view in which the image is projected so that both the image and the real world behind the image can be simultaneously seen by the user. By completely dimming the display, the virtual image can be extinguished from that portion of the user's field of view so that the user can see the real world, but the user does not see the virtual image at all. It is noted that a window into the real world through the displayed image can also be accomplished by providing a display which can be controlled so that light does not pass from the display in a defined area or window thereof. When the light blocking feature of the display is actuated, a window into the real world in the area of the blocked display light is provided through the displayed image, and when not actuated, the image is seen in its entirety.

The binocular optical system shown in FIGS. 2–6 automatically compensates for variations in the interpupillary distance of different users, wherein those variations may be as great as one inch. More particularly, the system automatically accommodates users having an interpupillary distance that is within a 2–3 inch range. This is accomplished by the combination of the prisms 32 and 34 with a concave reflector shown as the visor 36. More particularly, the prism in each of the right-eye and left-eye optical paths bends light from any location along the width, W, of the prism representing various positions of the users' eyes, and thus various interpupillary distances, towards the central area, C, on the visor 36. The prisms convert the 2–3 inch difference between the centers of the users' eyes to within 0.2 inches–0.3 inches on the face 42 of the visor 36 in the central area C thereof. The visor 36 then reconciles this small difference at the face of the display by focusing parallel light incident to surface 42 on the same point on the display 28 so that the user's left eye sees the same image that the user's right eye sees through the optical system.

Figure 10:
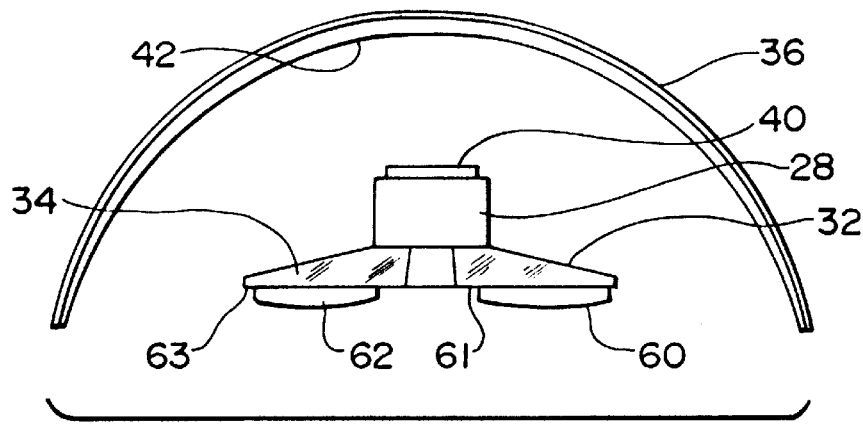
FIG. 10 is a top view of the optics of FIG. 5 modified in accordance with another embodiment of the head mounted display system of the present invention.

The visor 36 may be spherical in shape so as to project an enlarged image of the displayed information. It is noted, however, that the visor 36 may also be parabolic in shape or have another shape so as to obtain the desired degree of magnification with minimal distortions of the image, as is well known. Further, separate concave reflectors for each eye may be used. Due to the compact nature of the optical system, the visor extends out from the user by only 70 mm or less. The prisms 32 and 34 may be formed as a single element 30 or as two distinct elements. Further, as shown in FIG. 10, a respective lens 60–62 may be mounted on or adjacent to the exit surface 61, 63 of the respective prism 32, 34 in the right-eye and left-eye optical paths 50, 52. Each of the lenses 60 and 62 is preferably a convex lens to increase the field of view of the image. Each of the prism-lens pairs 32, 60 and 34, 62 also preferably forms an achromat to correct chromatic aberrations.

The display 28 is preferably such that the contrast and brightness thereof does not change over 10° from the perpendicular to the display so that the image seen by the left eye has the same brightness and contrast as the image seen by the right eye. In order for the image seen by the left eye to appear at the same location as the image seen by the right eye, the left-eye optical centerline path and the right-eye optical centerline path must be equal in length. Further, the path lengths to the right side of the display 28 from one eye must be equal to the path length from that same eye to the left side of the display 28. If the path lengths to the right side of the display and the left side of the display are not equal, the image will appear distorted such that one side of the image appears larger than the other side of the image. These latter requirements are accomplished by an optical system wherein the chief rays of each optical path are equal in length.

Figure 9:
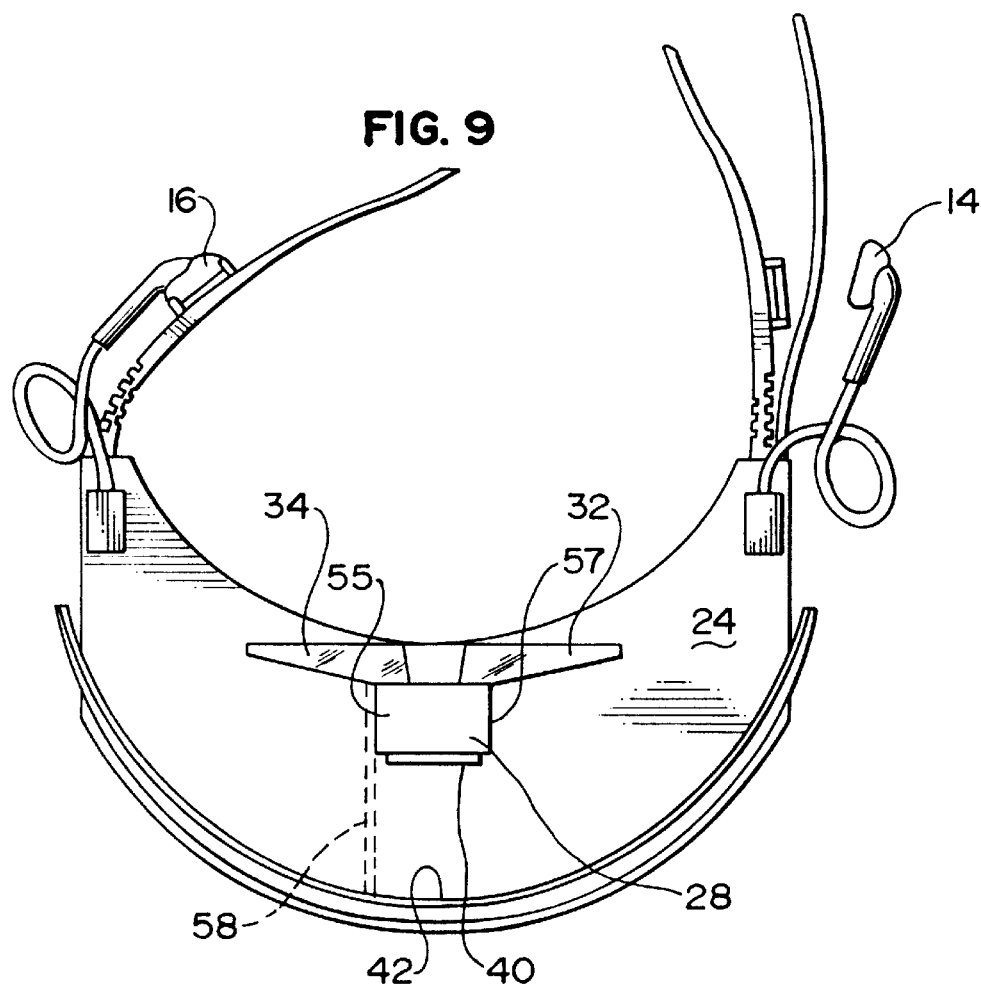
FIG. 9 is a bottom view of the head mounted display system depicted in FIG. 2 modified with the addition of a movable eye block so as to make the system monocular.

It is noted that if the contrast and brightness of the display cannot be maintained relatively constant over 10° from the perpendicular to the display, the optical system depicted in FIGS. 2–6 may be converted to a monocular system by adding a light block 58, as shown by the dotted line in FIG. 9. The light block 58 prevents light from the display from reaching one of the user's eyes. Preferably, the light block 58 is removably mounted on the bottom cover 24 or on the side of the display 28 so that the light block may be positioned either on the side 55 of the display or on the opposite side 57 thereof. Because most people have a dominant eye, if the light block is positioned on the side of the display so as to block light from the display 28 from reaching the non-dominant eye, it will appear to the user that he is viewing the display with both eyes, although he is actually only viewing the display with his dominant eye. The bottom view of the optical display system shown in FIG. 6 illustrates the position of the light block 58 for a right-eye dominant user. Although this system is not binocular, it is extremely flexible in that it can be utilized by both right-eye dominant and left-eye dominant people by merely changing the position of the light block 58 from one side of the display 55, 57 to the other side of the display 57, 55.

FIG. 11 depicts a true stereo embodiment of the present invention that utilizes the same binocular system as described in FIGS. 2–6 or FIG. 7, wherein the display 28' is controlled to provide distinct images to the left eye and the right eye with a block 64 separating the right-eye optical path from the left-eye optical path.

The embodiment of the present invention illustrated in FIG. 12 is similar to the embodiments depicted in FIGS. 2–6. However, the position of the display 28 is altered so that instead of facing the inner surface 42 of the visor 36, the face 40 of the display 28 faces downward onto a reflective surface 72 that is disposed at a 45° angle with respect to the display surface 40 in order to reflect the information depicted on the face 40 of the display 28 onto the inner surface 42 of the visor 36. Although the reflector 72 may be formed of a conventional flat mirror, a prism element 70 with a reflective surface 72 is preferred to prevent the reflective surface 72 from being marred by fingerprints or scratches.

The features of the optical system depicted in FIGS. 2–6 can be obtained by other binocular optical systems. For example, FIG. 13 is another embodiment of a binocular optical system in accordance with the present invention that utilizes a single display; automatically compensates for variations in IPDs of users up to one inch; directs the user's eyes inward towards the location of a virtual image that is located a distance from the user that is less than infinity; and/or that projects an enlarged image of displayed information in the user's direct line of sight and central field of view, while maintaining at least a portion of the user's peripheral view of each of the user's eyes free from obstruction. Whereas the embodiment illustrated in FIGS. 2–9 accomplishes these features with a semi-reflective visor and prisms, the embodiment of FIG. 13 accomplishes these features utilizing a lens, mirror(s) and a beam splitter in each of the right-eye and left-eye optical paths. One of the advantages of the embodiment depicted in FIG. 13 is that the contrast and brightness of the display 28 need not be maintained constant over 10° from the perpendicular to the display to prevent conflicting information from being seen by the right and left eyes of the user.

More particularly, the embodiment of the present invention shown in FIG. 13 includes a display 28 with a beam splitter 80 disposed at a 45° angle with respect to the face 40 of the display. The beam splitter 80 splits the light from the display 28 along a right-eye optical path 50' and a left-eye optical path 52'. The light from the display 28 directed by the beam splitter 80 along the right-eye optical path 50' is reflected by a mirror 82 into the user's right eye through a biconvex lens 84. The beam splitter 80 directs light from the display 28 along the left-eye optical path 52' so that the light is reflected by a mirror 86 to a second mirror 88 into the user's left eye through a biconvex lens 90. Each of the biconvex lenses provides focusing and magnification of the image.

With this embodiment, the display may be positioned at a location 87 or alternatively at a location 89. Positioning of the display 28 at location 89 so that the outer edge of the display 92 does not extend beyond the outermost edge of the mirrors 80 and 82 provides a more compact head mounted display unit with the weight thereof closer to the user's face. It is desirable to keep the weight of the optical system and display as close to the user's head as possible to reduce the downward torque of the system and eliminating the need for counter weights on the support 12.

When the virtual image of the information depicted on the display 28 is to appear at optical infinity, the focal point of each of the lenses 84 and 90 is located at the center of the display face 40. Further, the beam splitter 80 is positioned at a 45° angle with respect to the face 40 of the display 28 with the mirror 82 parallel to the beam splitter 80. The mirror 86 is perpendicular to the beam splitter 80 and the mirror 88 is parallel to the mirror 86.

If, however, the virtual image is to appear at a distance from the user that is less than infinity, for example two feet, the mirror 82 in the right-eye optical path and the mirror 88 in the left-eye optical path are angled slightly inwardly so as to direct the user's eyes inward at a convergence angle that is natural for a person viewing an object at a distance equal to the distance of the virtual image from the user. For example, for a virtual image that is to appear approximately two feet from the user, a convergence angle of approximately 2°–4° is desired. Therefore, the mirror 82 and the mirror 88 are positioned at an angle α that is approximately 41°–43° from a line that is parallel to the face 40 of the display 28, as opposed to being at a 45° angle with respect thereto. With the user's eyes directed inwardly to the location of the virtual image at a natural angle, the head mounted display system of the present invention is more comfortable and less eye fatiguing than prior systems. It is noted that in this embodiment, the display 28 is at a distance from each of the lenses 84 and 90 that is less than the focal length of each of the lenses.

Regardless of whether the virtual image is to be focused at infinity, or at less than infinity, the length of the right-eye optical centerline path 50' represented by the length of the segments a, b, and c is equal to the length of the left-eye optical centerline paths represented by the length of the segments a, d, e, and f. Further, the distance from a given eye to the one side of the display 28 is equal to the distance from that eye to the opposite side of the display, such that the chief rays of the system are of equal length.

The embodiment of the present invention depicted in FIG. 13 automatically compensates for variations in the interpupillary distance of various users because each of the focusing lenses 84, 90 is such that light at any location along the width, i.e. diameter, thereof representing various positions of a users' eyes and thus various interpupillary distances, is focused on the same point with the mirrors and beam splitter disposed in each of the right eye and left eye optical paths to direct the path of light from the user's eyes through the respective lenses to the same point. Further, the size of the beam splitter 80 and the mirrors 82, 86, and 88 are selected so as to account for light diverging outward from the face 40 of the display 28 by an angle β of approximately 2.5° so as to insure that the entire display is reflected by the beam splitter and mirrors into the user's eyes for user's having one inch variations in their IPDs.

The system of FIG. 13 is a very compact, lightweight system with a wide field of view, being on the order of 20°–45°. The lenses 84, 90; mirrors 82, 86, 88, beam splitter 80, and the display 28 are preferably mounted on the bottom cover 24 of the frame 12, such that the exit surface of each of the lenses 84, 90 is approximately 20 mm from the user's eyes. Because each of the lenses 84 and 90 are relatively close to the user's eyes, the image has a large field of view. However, the 20 mm spacing between each of the lenses and the user's respective eyes is typically sufficient to allow the user to wear a pair of glasses with the head mounted display system. The lenses 84 and 90 may actually be disposed even closer to the user's eyes, but preferably no closer than the lenses of a typical pair of glasses worn by a user so as to prevent anxiety in the user when an object is extremely close to his eyes. The lenses may also be positioned farther from the user's eyes; however, in order to obtain a given field of view, as the distance between the eye and the lens 84, 90 increases, the diameter of the lens generally increases. It is noted that with the lenses 84 and 90 located approximately 20 mm from the user's eyes and with the display 28 at the location 89, the head mounted display unit 10 extends only about 2½ inches out in front of the user's face.

The optical system depicted in FIG. 13 is mounted on the frame 12 so as to project the virtual image in the central field of view and direct line of sight of each of the user's eyes. The size of the lenses 84 and 90, as well as the configuration of the support 12, are such as to maintain at least a portion of the peripheral view of each of the user's eyes free from obstruction so as to obtain all of the advantages described above for the embodiment of the invention depicted in FIG. 2. As shown in FIGS. 7 and 8, the exit surface of the optical element(s) closest to the user's eyes, which in the case of FIG. 13 are the lenses 84 and 90, is represented by the line AB where A and B respectively represent the locations of the outer side edges of the closest optical element(s). As described above, the exit surface of the closest optical elements, the lenses 84 and 90, is preferably approximately 20 mm from the user's eyes. The diameter of the lenses is preferably on the order of 25 mm–35 mm so that a user having an IPD of approximately 2.5 inches need only move an eye to the side through an angle α to focus on his surroundings in his side peripheral vision. The angle α will vary for user's having different IPDs, but is generally in the range of 5°–15°. Because the diameter of the lenses 84 and 90 is on the order of 25 mm–35 mm, the optical system of FIG. 13 maintains a significant amount of the user's lower peripheral vision free from obstruction.

FIG. 14 illustrates a slight modification of the embodiment of the present invention depicted in FIG. 13. In FIG. 14, the entire optical system from the lenses 84 and 90 to the display 28 is rotated 90° from that shown in FIG. 10 so that the axis of each of the lenses 84 and 90 is perpendicular to the respective axes of the user's right eye and left eye. A pair of mirrors are added to the system such that one mirror 100 is disposed in the right-eye optical path at a 45° angle with respect to the lens 84 so as to reflect the image from the display through the lens into the user's eye. Similarly, a reflector 100 is positioned in the left-eye optical path at a 45° angle with respect to the lens 90 so as to reflect the image from the display through the lens into the user's left eye. It is noted that the reflector 100 may be any type of mirror including a holographic mirror, a curved mirror, etc.

In the embodiment of FIG. 11, the reflectors 100 can be positioned in the central field of view and direct line of sight of the user's eyes while maintaining the user's peripheral view unobstructed. The reflectors 100 may also be positioned in the upper peripheral view of the user's eyes for those applications where the image displayed is not to be the main focus of the user's attention. The reflectors 100 are also preferably semi-reflective, for example 80% reflective so as to allow the user to see the real world through the reflector 100.

As described above, the display 28 may include a brightness control 60 to allow the brightness of the display 28 to be varied such that the display at its brightest results in a virtual image that completely blocks the user's view of the real image in the portion of the user's field of view in which the image is projected. By dimming the brightness of the display 28, the virtual image appears to be superimposed on the real world in that portion of the user's field of view in which the image is projected so that both the image and the real world behind the image can be simultaneously seen by the user. By completely dimming the display, the virtual image can be extinguished from that portion of the user's field of view so that the user can see the real world, but the user does not see the virtual image at all. As described above, this feature of controlling the display 28 to provide a window through the image into the real world can also be accomplished by providing a display which can be controlled so that light does not pass from the display in a defined area or window thereof. When the light blocking feature of such a display is actuated, a window into the real world is provided through the displayed image in the area where light is blocked from the display. When the light blocking feature is not actuated, the image is seen in its entirety.

Figure 15:
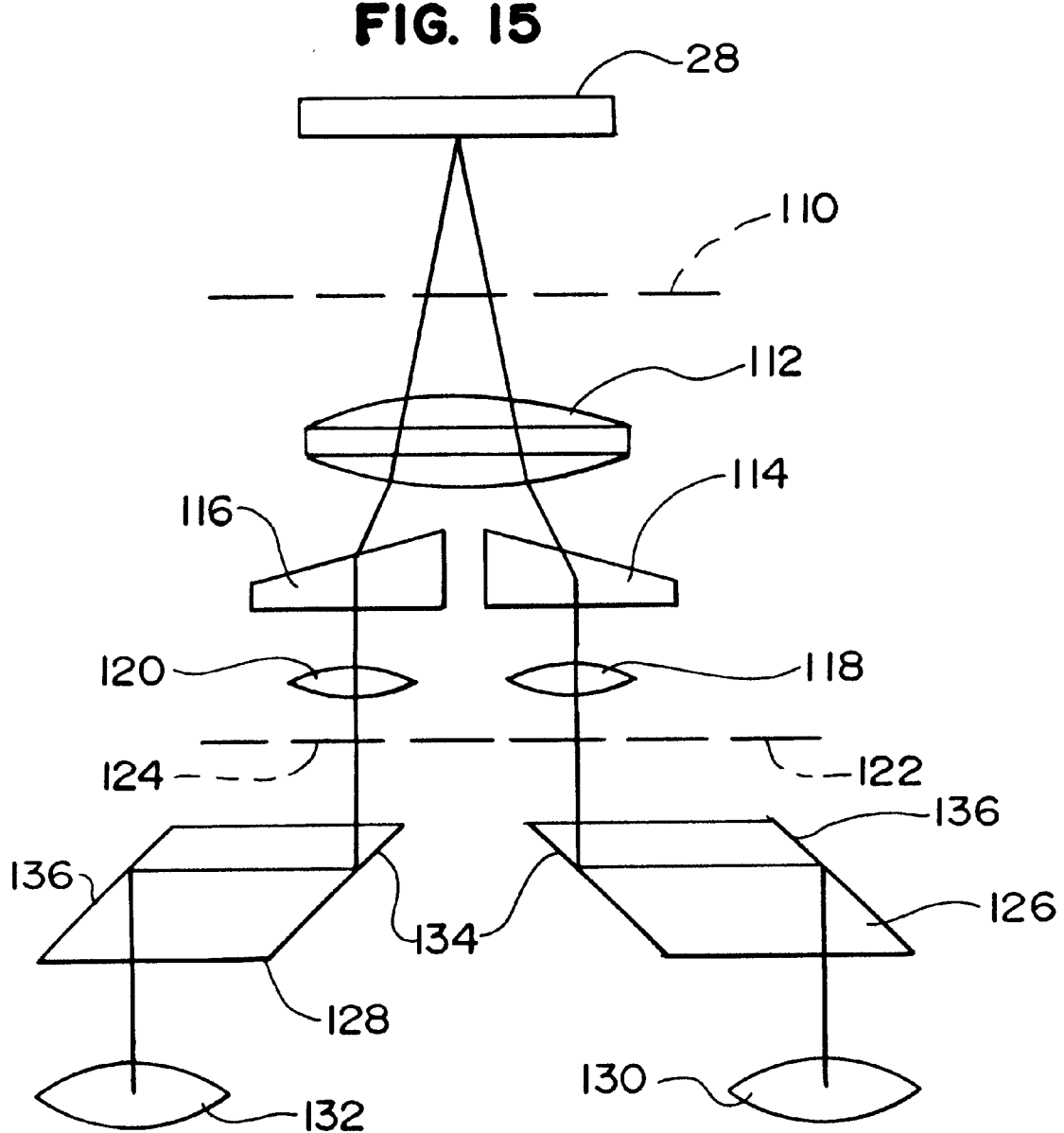
FIG. 15 is a schematic diagram of the optics in accordance with a further embodiment of the head mounted display system of the present invention wherein dotted lines represent mirror folds of the system.

The embodiment of the binocular optical system depicted in FIG. 15 has the various features described above for the other embodiments, but includes an internal image plane to allow the display 28 to be positioned more remotely from the user's eyes while still obtaining a fairly large field of view. In this embodiment, the display 28 is positioned such that the face 40 thereof is facing outward from the user. A mirror illustrated by the dotted line 110 is disposed at a 45° angle with respect to the display so as to direct the image of the displayed information downward in front of the user's face to a lens 112 which lies in a generally horizontal plane. The lens 112 focuses light onto the display 28. A pair of prisms 114 and 116 disposed below the lens 112 bend the light that passes through the lens along respective right-eye and left-eye optical paths through a second pair of lenses 118 and 120. The lenses 118 and 112 lie in the same horizontal plane below the prisms 114 and 116. Mirrors 122 and 124 are disposed in the respective right-eye and left-eye optical paths at 45° angles with respect to the lenses 118 and 120 so as to direct light back towards the user's eyes to respective inner surfaces 134 of a pair of prisms 126 and 128. The light is reflected in each optical path from the respective inner surfaces 134 of the prism elements 126 and 128 to respective outer surfaces 136 thereof. The respective outer surfaces 136 of the prisms 126 and 128 in turn reflect the light through respective lenses 130 and 132 into the user's eyes.

The optical system of FIG. 15 results in an intermediate image plane within the prisms 126 and 128 wherein the respective lenses 130 and 132 are located one focal length from the intermediate image plane in the prisms 126 and 128. The lenses 118 and 120 are such as to focus light incident thereto from the display onto the respective image planes within the prisms 126 and 128. This embodiment of the binocular optical display system is similar to those embodiments described above in that the prisms 114, 116 bend light towards a central area with the lens 112 focusing the light to a single point from each of the optical paths onto a single point on the display 28. Further, the surfaces 134 and 136 of the respective prisms 126 and 128 direct the light from the user's eye in towards the center of the system.

FIGS. 16–19 illustrate one embodiment of a foldable keyboard housing 18, in accordance with the present invention, that may be utilized to house the electronics of a computer. The electronics of the computer are those conventionally used in a lap top computer, such as a main microprocessor and, if desired, a coprocessor, coupled to a memory device such as a RAM and a disk or diskette drive, as is well known. The microprocessor is responsive to information input on the keyboard 201 to generate video input signals that are coupled to or communicated to the drive electronics for the display 28 to display alphanumeric and/or graphic information on the display 28. Because the computer, in accordance with the present invention, utilizes a head mounted display system, as described above, the overall computer is much more lightweight and compact than conventional lap top computers. However, the computer of the present invention actually provides a much larger display than has heretofore been possible with prior lap top or notebook computers, due to the optics of the head mounted display system. Further, because the head mounted display unit 10 maintains the user's lower peripheral field of view unobstructed, the user can easily see the keyboard if needed to enter information to the user.

The keyboard housing 18, as shown in FIGS. 16–19, is divided into two halves 200 and 202 that are pivotal about a point in a hinge 204 so as to allow the keyboard to be folded in half as depicted in FIG. 14. Each of the keyboard housing halves 200 and 202 includes an electrical connector 206 and 208 which mate when the two halves are unfolded so as to electrically connect that portion of the computer electronics disposed within the housing 200 with the computer electronics disposed within the housing 202.

Figure 16:
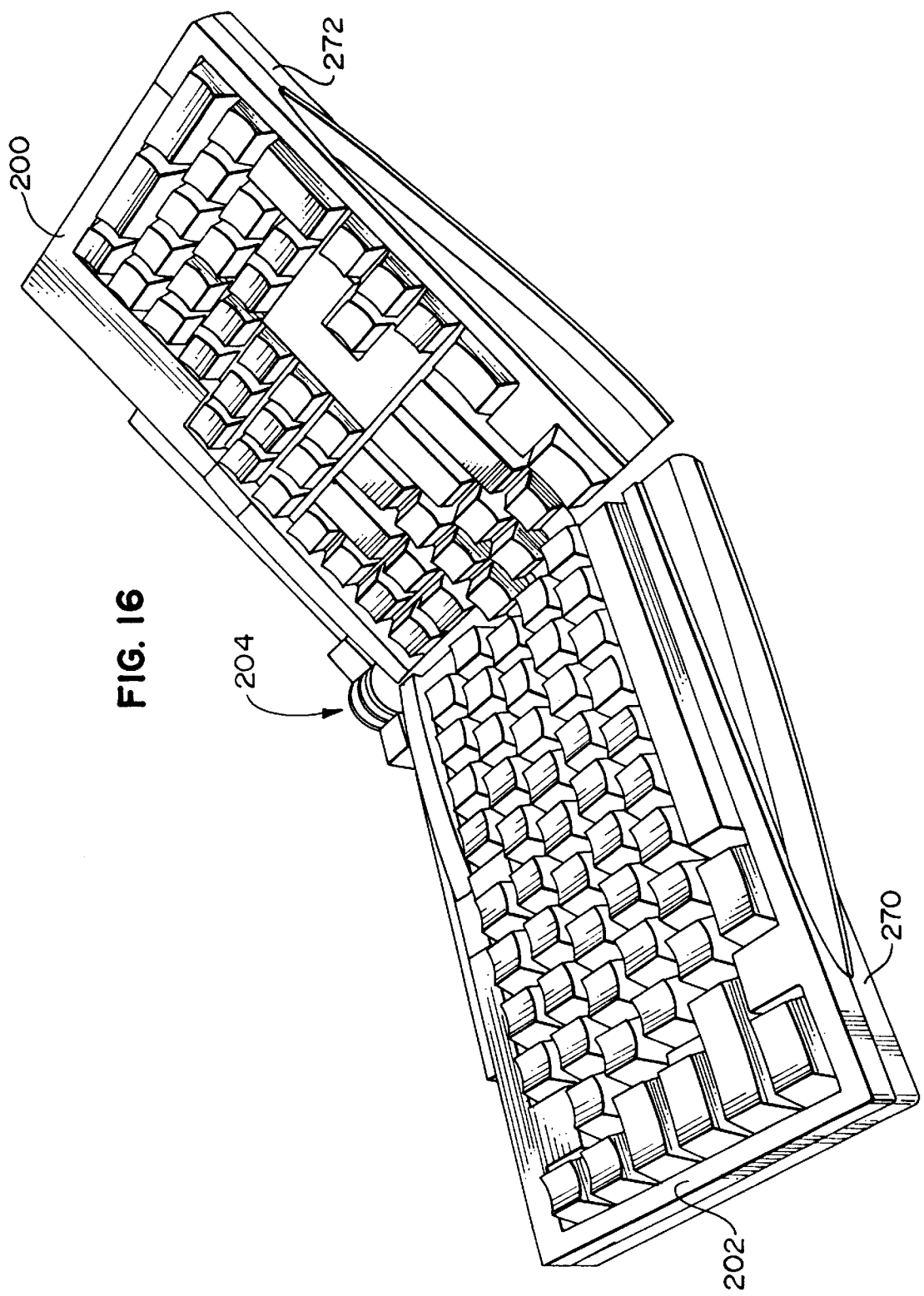
FIG. 16 is a perspective view of a keyboard as shown in FIG. 1 partially folded.
Figure 19:
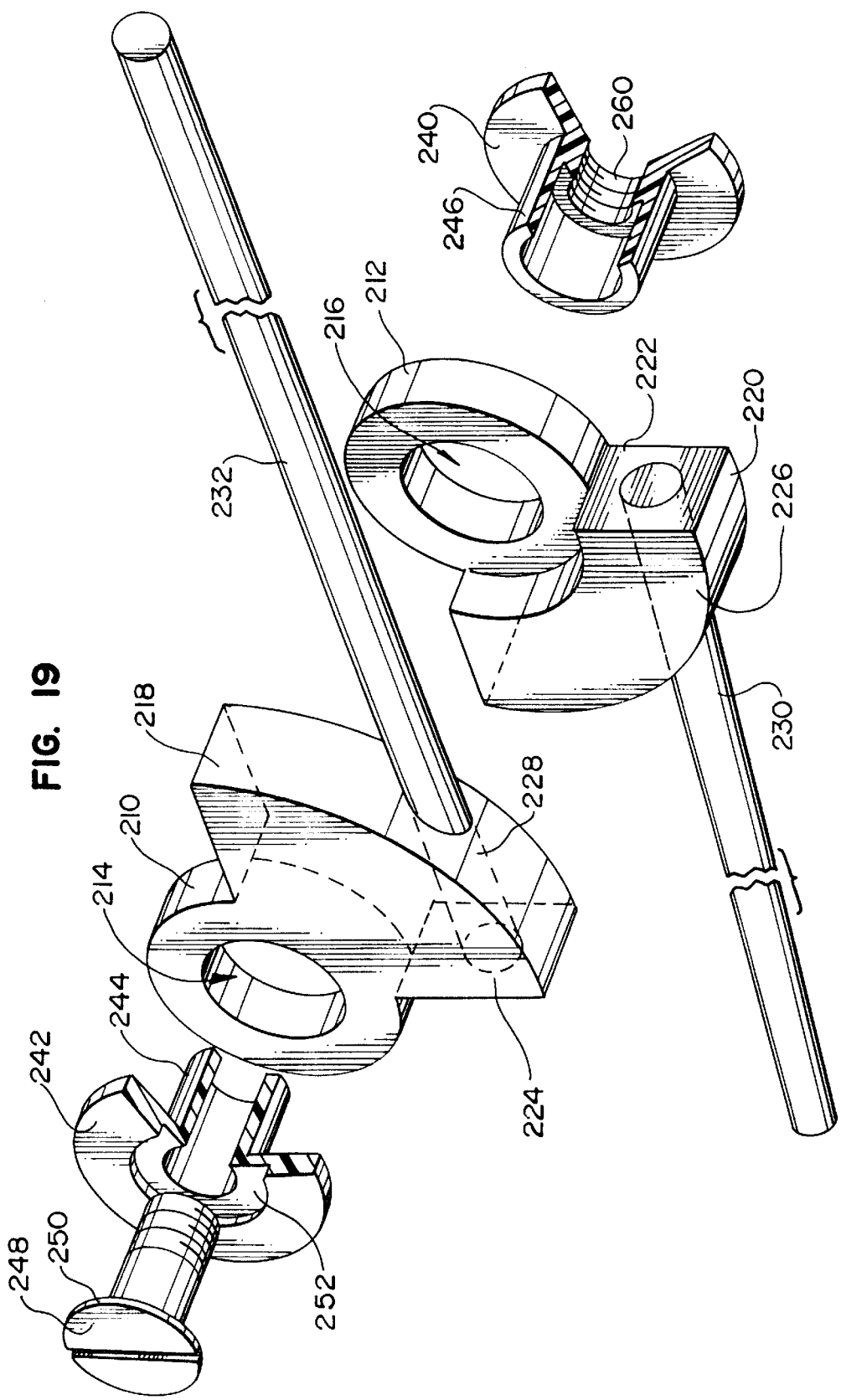
FIG. 19 is an exploded, perspective view of the hinge assembly of the keyboard depicted in FIG. 16.
Figure 26:
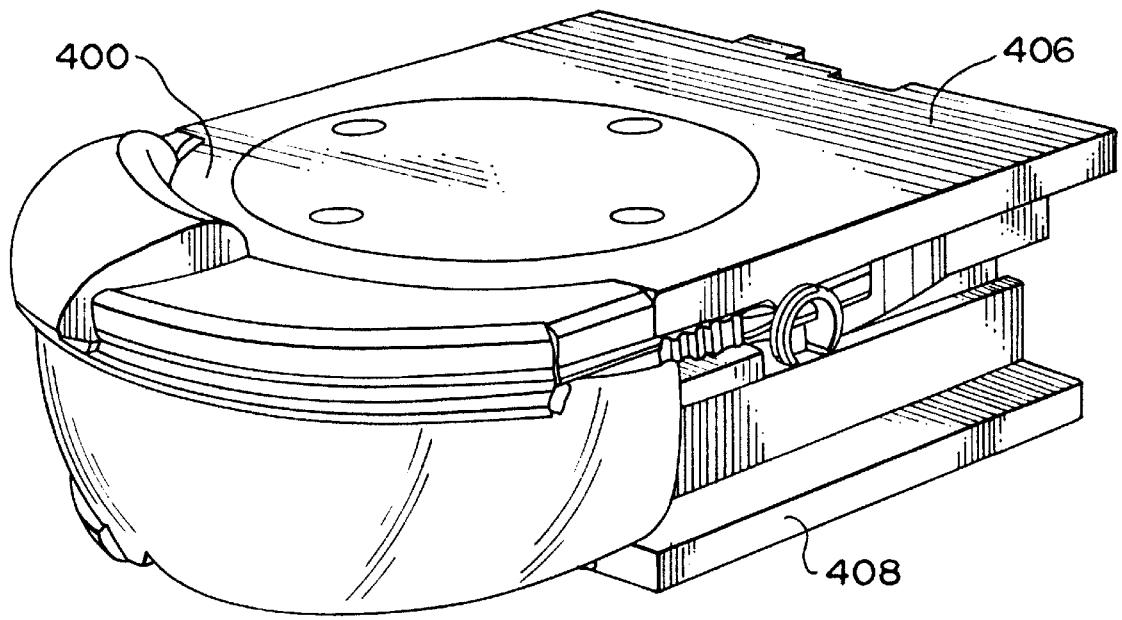
FIG. 26 is a perspective view of a head mounted display system mounted on the keyboard of FIG. 24 in its folded position.

As shown in FIGS. 15 and 16, the hinge 204 includes a pair of cylindrical members 210 and 212 with centrally located apertures 214 and 216 located therein. Each of the members 210 and 212 includes an integrally formed, generally arcuate flange portion 218 and 220 that extends over approximately a quarter of the member 210, 212. When assembled, the member 210 overlies the member 212 so that the apertures 214 and 216 are aligned with an end 222 of the arcuate flange 220 abutting an end 224 of the arcuate flange 218. Each of the arcuate flanges includes an aperture 226 and 228 so as to receive an end of a respective rod 230 and 232 therein. When the member 210 is mounted on the member 212 such that the ends 220 and 224 of the respective arcuate flanges 220 and 218 abut, the rods 230 and 232 are longitudinally aligned.

The cylindrical members 210 and 212 are held together by pins 240, 242 and a bolt 248 that extend through the apertures 216 and 214. The pin 242 has a cylindrical portion 244 that extends into the aperture of the cylindrical portion 246 of the pin 240. A bolt 248 has a head 250 that engages a lip 252 of the pin 242 so that when the bolt 248 is inserted through the cylindrical portion 244 of the pin 242, the threads of the bolt 250 can engage the threaded portion 260 of the pin 240. The pins 240 and 242, and bolt 248, hold the circular members 210 and 212 together in axial alignment, but allow the members 210 and 212 to pivot with respect to each other so as to move the rods 230 and 232 out of longitudinal alignment in order to fold the keyboard housing 18. As seen in FIG. 15, the rods 230 and 232 are secured to respective bottom portions 270 and 272 of the respective keyboard housing halves 202 and 200 by means of gripper members 274 and 276 respectively.

An alternative hinge arrangement for a foldable keyboard is illustrated in FIGS. 17–20 for the foldable keyboard housing 18'. The bottom portions 300 and 302 of respective housing halves 304 and 306 of the keyboard 18' are formed with pairs of longitudinally-aligned slots 308, 310 and 312, 314 disposed on opposite sides of the bottom portions 300 and 302. The longitudinally-aligned slots 308 and 310 include a hinge member 316, whereas the longitudinally-aligned slots 312 and 314 include a hinge member 318. Each of the hinges 316, 318 includes a center bar 320 having a pair of apertures 322 through which respective pins 324, 325 extend. The pins 324, 325 extend through respective longitudinally-aligned slots 326, 328 disposed in adjacent ends of respective outer bars 330 and 332. The pins 324, 325 slide along in the respective slots 326, 328 to allow the bars 330 and 332 to move in towards each other or to move apart from each other. The bars 330 and 332 are pulled away from each other so as to separate the two halves 304 and 306 of the keyboard housing 18'. The bars 330 and 332 are then pivoted about the respective pins 324, 325 so that the bars extend generally parallel to one another when the two halves of the keyboard 304 and 306 are folded together, as shown in FIG. 20.

Whereas the embodiments of the foldable keyboards depicted in FIGS. 13–20 illustrate a standard-size computer keyboard, the keyboard of FIG. 21 is a smaller-size computer keyboard utilizing the same hinge assembly as the embodiment depicted in FIGS. 13–16. Further, the keyboard illustrated in FIGS. 21–23 is designed so as to have an arcuate mounting surface 400 on one end thereof for mounting the head mounted display unit 10 thereon when it is not in use. The opposite end 402 of the keyboard 404 is also arcuate in shape so that both halves 406 and 408 of the keyboard accommodate the head mounted display unit 10. A computer keyboard with a mounting surface for the head mounted display unit 10 provides a very compact lightweight computer system that can easily be transported.

The overall size and weight of the computer system is substantially reduced over that of conventional lap top or notebook computers because the head mounted display unit 10 is considerably smaller and lighter in weight than conventional display panels utilized in portable computers. Although more compact and lighter in weight, the head mounted display unit 10, in accordance with the present invention, provides a high-quality display for alphanumeric information with the virtual image of the displayed information being as large or larger than a conventional full-size display for a desk-top personal computer. Because the head mounted display unit 10 is a personal display system, the user can view confidential information in a crowded environment without disclosing the displayed information to others. Further, because the binocular optical system of the present invention maintains the user's peripheral vision free from obstruction and preferably maintains at least the lower peripheral vision of the user free, the user can selectively view the displayed alphanumeric text or the keyboard as he desires.

A number of the features of the present invention are not limited to a single display, binocular optical system that projects an image in the central field of the user's view, but are applicable to head mounted display units that are monocular or use two displays or that project the virtual image in the user's peripheral field of view. Further, various combinations of optical elements other than those described in detail herein can be employed in accordance with the present teachings as well as many other modifications and variations of the present invention. Thus, it is to be understood that, within the scope of the appended claims, the invention may be practiced otherwise than as described hereinabove.

What is claimed and desired to be secured by Letters Patent is:

1. A head mounted display system comprising
   a support to mount the display system on a user's head;
   a single display mounted on said support for displaying video information;
   a binocular optical system for projecting an enlarged virtual image of said displayed video at a distance from the user that is less than infinity, said optical system including a right-eye optical centerline path and a left-eye optical centerline path having at least one optical element in each of said paths wherein said right-eye and left-eye optical centerline paths are angled in towards said virtual image.

2. A head mounted display system as recited in claim 1 wherein said binocular optical system projects said virtual image in the central field of view of each of the user's eyes, said optical system and support maintaining at least a portion of the peripheral view of each of the user's eyes free from obstruction to allow the user to selectively focus on said virtual image or not.

3. A head mounted display system as recited in claim 1 wherein said binocular optical system automatically compensates for approximately one inch variations in the inter-pupillary distance of different users.

4. A head mounted display system as recited in claim 1 wherein said binocular optical system includes a semi-transparent reflector into which the user looks to view said virtual image and said display includes a brightness control to allow the brightness of the display to be varied such that the virtual image can be controlled to block that portion of the user's field of view in which the image is projected, to be superimposed on the real world in said portion of the user's field of view so that both the image and the real world in said portion of the view can be simultaneously seen or to be extinguished from said portion of the user's field of view.

5. A head mounted display system as recited in claim 1 wherein said display is a left-handed liquid crystal display.

6. A head mounted display system as recited in claim 1 wherein said display is coupled to a remote device for receiving video input signals therefrom representing alphanumeric information to drive said display, said optical system being mounted on said support to maintain the lower peripheral view of each of the user's eyes free from obstruction to allow said user to look downward to view said remote device.

7. A head mounted display system as recited in claim 1 including an alphanumeric keyboard in communication with said display to allow alphanumeric information input on said keyboard to be depicted on said display.

8. A head mounted display system as recited in claim 7 wherein said keyboard includes a foldable housing.

9. A head mounted display system as recited in claim 7 wherein said keyboard includes a surface contoured for mounting said support for said binocular optical system and display on said keyboard.

10. A head mounted display system as recited in claim 1 wherein said support includes an outermost surface disposed in front of the user's face, said outermost surface extending no more than two and one-half inches from the user's head.

11. A head mounted display system as recited in claim 1 wherein said optical system includes at least one optical element having a magnification power associated therewith wherein said optical element is no closer than 20 mm from the user's eye.

12. A head mounted display system as recited in claim 1 wherein said optical system includes at least one optical element having a magnification power associated therewith wherein said optical element is within 20 mm to 70 mm of the user's eye.

13. A head mounted display system as recited in claim 1 wherein said virtual image has at least a 20° field of view.

14. A head mounted display system as recited in claim 1 wherein said optical centerline paths are angled in towards said virtual image by approximately 2° to 3°.

15. A head mounted display system as recited in claim 1 wherein said binocular optical system includes at least one prism disposed along each of said right-eye and left-eye centerline paths to bend the respective paths towards a central area on a concave reflector having an optical centerline that intersects the center of the display.

16. A head mounted display system as recited in claim 1 wherein said binocular optical system includes at least one mirror disposed along each of said right-eye and left-eye centerline paths to direct the respective paths to the same point and a lens disposed along each of the optical paths adjacent the user's eye.

17. A head mounted display system as recited in claim 1 wherein said binocular optical system includes a beam splitter intersecting both said right-eye and left-eye paths.

18. A head mounted display system comprising
   a support to mount the display on a user's head;
   a single display mounted on said support for displaying video information;
   a binocular optical system mounted on said support for projecting an enlarged image of said video at a distance from the user in the central field of view of each of the user's eyes such that said image blocks the user's view in said central field, said optical system and support maintaining at least a portion of the peripheral view of each of the user's eyes free from obstruction to allow the user to selectively focus on said enlarged image or not, said optical system projecting said enlarged image at a distance that is less than infinity and includes at least one optical element in each of a right eye optical path and a left eye optical path for directing a user's eyes to angle inward towards the location of said enlarged image.

19. A head mounted display system as recited in claim 18 wherein said binocular optical system automatically compensates for approximately one inch variations in the inter-pupillary distance of different users.

20. A head mounted display system as recited in claim 18 wherein said binocular optical system includes a semi-transparent reflector into which the user looks to view said virtual image and said display includes a brightness control to allow the brightness of the display to be varied such that the virtual image can be controlled to completely block that portion of the user's field of view in which the image is projected, to be superimposed on the real world in said portion of the user's field of view so that both the image and the real world in said portion of the view can be simultaneously seen or to be extinguished from said portion of the user's field of view.

21. A head mounted display system as recited in claim 18 wherein said display is coupled to a remote device for receiving video input signals therefrom representing alphanumeric information to drive said display, said optical system being mounted on said support to maintain the lower peripheral view of each of the user's eyes free from obstruction to allow said user to look downward to view said remote device.

22. A head mounted display system as recited in claim 18 including an alphanumeric keyboard in communication with said display to allow alphanumeric information input on said keyboard to be depicted on said display.

23. A head mounted display system as recited in claim 22 wherein said keyboard includes a foldable housing.

24. A head mounted display system as recited in claim 22 wherein said keyboard includes a surface contoured for mounting said support for said binocular optical system and display on said keyboard.

25. A head mounted display system as recited in claim 18 wherein said support includes an outermost surface disposed in front of the user's face, said outermost surface extending no more than approximately two and one-half inches from the user's head.

26. A head mounted display system as recited in claim 18 wherein said optical system includes at least one optical element having a magnification power associated therewith wherein said optical element is no closer than 20 mm from the user's eye.

27. A head mounted display system as recited in claim 18 wherein said optical system includes at least one optical element having a magnification power associated therewith wherein said optical element is within 20 mm to 70 mm of the user's eye.

28. A head mounted display system as recited in claim 18 wherein said binocular optical system includes at least one prism disposed along each of said right-eye and left-eye centerline paths to bend the respective paths towards a central area on a concave reflector having an optical centerline that intersects the center of the display.

29. A head mounted display system as recited in claim 18 wherein said binocular optical system includes at least one mirror disposed along each of said right-eye and left-eye centerline paths to direct the respective paths to the same point and a lens disposed along each of the optical paths adjacent the user's eye.

30. A head mounted display system comprising
a support to mount the display system on a user's head;
a single display mounted on said support for displaying video information;
a binocular optical system having a right-eye optical path and a left-eye optical path for projecting an enlarged virtual image of said displayed video a distance from the user, said optical system including in each of said paths at least one element for directing light along the path so that the path extends from the user's respective eye towards the same point on the display and at least one optical element for focusing and magnifying the video on said display, wherein said binocular optical system automatically compensates for approximately one inch variations in the interpupillary distance of various users.

31. A head mounted display system as recited in claim 30 wherein said at least one element for directing light in each of said paths is a prism.

32. A head mounted display system as recited in claim 30 wherein said at least one element for directing light in each of said paths is a mirror.

33. A head mounted display system as recited in claim 30 wherein said at least one element for focusing and magnifying is a concave reflector.

34. A head mounted display system as recited in claim 33 wherein said reflector is semi-transparent.

35. A head mounted display system as recited in claim 30 wherein said at least one element for focusing and magnifying is a lens.

36. A head mounted display system comprising
a support to mount the display system on a user's head;
a single image source of video information mounted on said support;
a binocular optical system for projecting an enlarged virtual image of said video from said image source at a distance from the user that is less than infinity, said optical system including a right-eye optical centerline path and a left-eye optical centerline path having at least one optical element in each of said paths wherein said right-eye and left-eye optical centerline paths are angled in towards the apparent location of said virtual image.

37. A head mounted display system comprising
a support to mount the display system on a user's head;
a single image source of video information mounted on said support;
a binocular optical system having a right-eye optical path and a left-eye optical path for projecting an enlarged virtual image of said displayed video a distance from the user, said optical system including in each of said paths at least one element for directing light from the user's eye towards the same point on the display and at least one optical element for focusing and magnifying the video on said display, wherein said binocular optical system automatically compensates for approximately one inch variations in the interpupillary distance of various users.

38. A head mounted display system comprising:
a support to mount the display system on a user's head;
a first prism mounted on said support in a right-eye optical path;
a second prism mounted on said support in a left-eye optical path;
a single display mounted on said support for displaying video information; and
a single reflector shaped to project an enlarged image of said video at a distance from the user, said reflector being mounted on said support in each of said right-eye and left-eye optical paths, wherein said first and second prisms bend the right-eye and left-eye optical paths from a user's eye towards each other and said reflector in each path focuses light traveling along the respective optical paths onto the same point relative to said display.

39. A head mounted display system as recited in claim 38 wherein said reflector is semi-reflective.

40. A head mounted display system as recited in claim 38 wherein said reflector is a single optical element intersecting both of said right-eye and left-eye optical paths.

41. A head mounted display system as recited in claim 38 wherein said first and second prisms are integrally formed into a single optical element.

42. A head mounted display system as recited in claim 38 wherein said display is mounted on said support so as to face said reflector.

43. A head mounted display system as recited in claim 42 wherein said display is a left-handed liquid crystal display.

44. A head mounted display system as recited in claim 38 wherein said display is mounted on said support so as to face a non-magnifying reflector that reflects said video into said image enlarging reflector.

45. A monocular head mounted display system comprising:

- a support to mount the display system on a user's head;
- a first prism mounted on said support in a right-eye optical path;
- a second prism mounted on said support in a left-eye optical path;
- a single display mounted on said support for displaying video information;
- a reflector shaped to project an enlarged image of said video at a distance from the user, said reflector being mounted on said support in each of said right-eye and left-eye optical paths, wherein said first and second prisms bend the right-eye and left-eye optical paths from a user's eye towards each other and said reflector in each path focuses light traveling along the respective optical paths onto the same point relative to said display; and
- a light block capable of being mounted adjacent either a first side of said display or adjacent a second side of said display opposite said first side and extending to said reflector from the side of the display adjacent to which said block is mounted to block light from said display from entering one of the user's eyes to provide a single monocular head mounted display system for right-eye dominant users and left-eye dominant users.

* * * * *